United States Patent
Schwartz

(10) Patent No.: US 8,270,588 B2
(45) Date of Patent: Sep. 18, 2012

(54) METHOD AND SYSTEM FOR INCOMING CALL MANAGEMENT

(76) Inventor: Ronald Schwartz, Ottawa (CA)

( * ) Notice: Subject to any disclaimer, the term of this patent is extended or adjusted under 35 U.S.C. 154(b) by 1658 days.

(21) Appl. No.: 11/620,617

(22) Filed: Jan. 5, 2007

(65) Prior Publication Data

US 2008/0084975 A1     Apr. 10, 2008

Related U.S. Application Data

(60) Provisional application No. 60/828,128, filed on Oct. 4, 2006.

(51) Int. Cl.
*H04M 3/42* (2006.01)

(52) U.S. Cl. ........... 379/210.02; 379/201.02; 379/88.02; 704/244

(58) Field of Classification Search ............. 379/210.02, 379/201.01, 201.02, 210.03, 88.01, 88.02; 704/244, 243, 231
See application file for complete search history.

(56) References Cited

U.S. PATENT DOCUMENTS

| | | | |
|---|---|---|---|
| 6,005,870 A * | 12/1999 | Leung et al. ................ | 370/466 |
| 6,289,084 B1 | 9/2001 | Bushnell | |
| 6,418,211 B1 | 7/2002 | Irvin | |
| 6,496,569 B2 * | 12/2002 | Pelletier et al. ........... | 379/88.21 |
| 6,631,182 B1 | 10/2003 | Schwab et al. | |
| 6,724,866 B2 * | 4/2004 | Kuhn et al. ................ | 379/88.21 |
| 6,748,068 B1 * | 6/2004 | Walsh et al. ............. | 379/142.03 |
| 6,975,708 B1 | 12/2005 | Scherer | |
| 7,027,569 B2 | 4/2006 | Price | |
| 7,054,417 B2 | 5/2006 | Casey et al. | |
| 7,295,660 B1 * | 11/2007 | Higginbotham et al. ..... | 379/196 |
| 2002/0128033 A1 | 9/2002 | Burgess | |
| 2002/0137490 A1 | 9/2002 | Gallant | |
| 2003/0152199 A1 | 8/2003 | Kuhn et al. | |
| 2004/0218743 A1 | 11/2004 | Hussain et al. | |
| 2005/0053215 A1 | 3/2005 | Bedingfield | |
| 2005/0129206 A1 | 6/2005 | Martin | |
| 2005/0195802 A1 | 9/2005 | Klein et al. | |
| 2005/0201362 A1 | 9/2005 | Klein et al. | |
| 2005/0201363 A1 | 9/2005 | Gilchrist et al. | |
| 2005/0259667 A1 | 11/2005 | Vinokurov et al. | |
| 2006/0013372 A1 | 1/2006 | Russell | |
| 2006/0094404 A1 | 5/2006 | Burgess | |
| 2006/0182029 A1 | 8/2006 | Kealy et al. | |

OTHER PUBLICATIONS

Shin, Dongwook and Choon Shim (QOVIA Inc.) "VOIP Spam Control With Gray Leveling", Jun. 2, 2006, pp. 3-9, 3$^{rd}$ Annual VOIP Security Workshop, Jun. 1-2, 2006, Berlin.

* cited by examiner

Primary Examiner — Olisa Anwah

(57) ABSTRACT

A method and system for automatic incoming call management uses function test results to build call signatures that are stored for later use in incoming call analysis. The function test results are used to compute a suspect score and confidence level associated with each incoming call, and are also used for making incoming call management decisions. A call treatment is selected based on the function test results and/or the computed suspect score and confidence level.

19 Claims, 17 Drawing Sheets

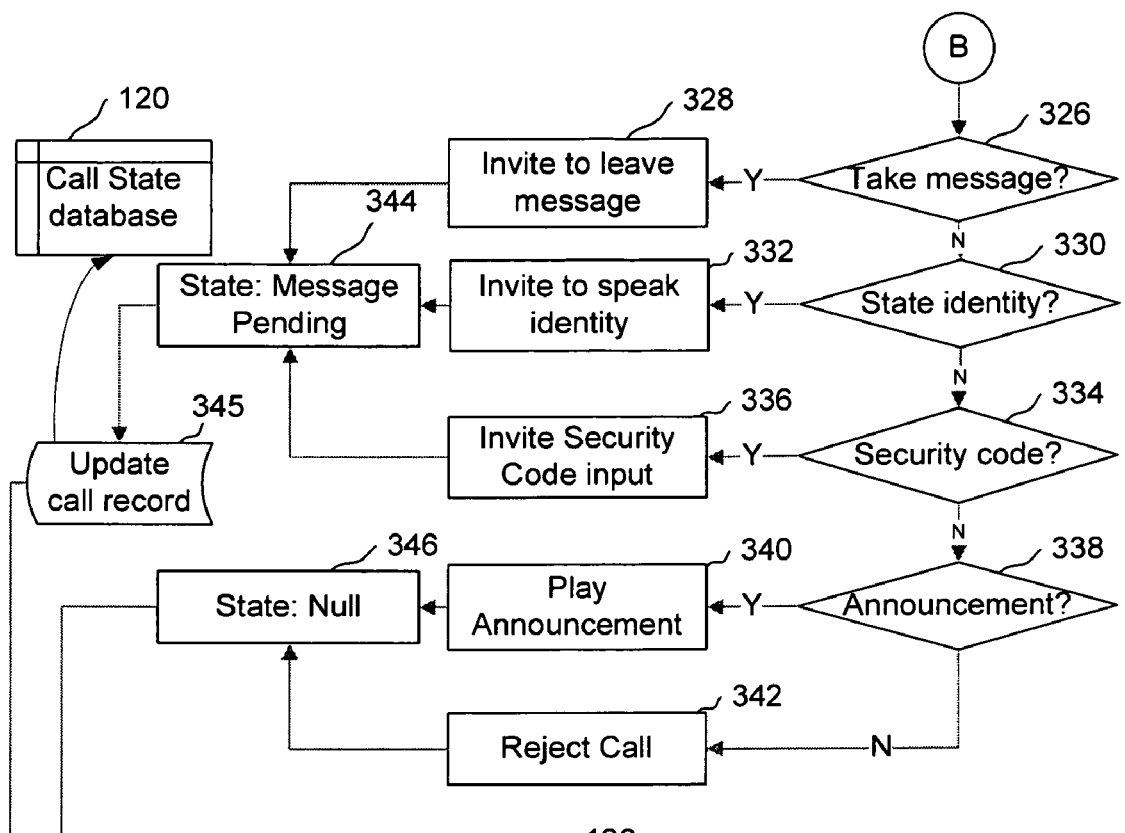
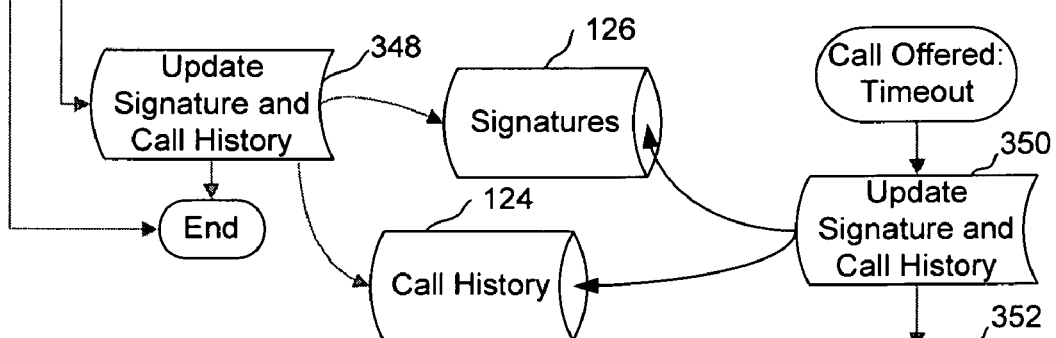
FIG. 7b
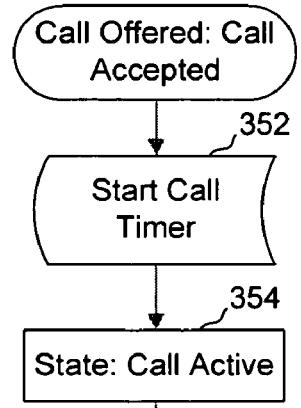
FIG. 7c

| Call Stage | Call Offer, call offer msg | State-x, event-y | ... |
|---|---|---|---|
| Function Test Attributes | F3 | Result | F23 | Result |
| | F11 | Result | | |
| | ... | ... | | |
| Fingerprint Attributes | A7 | Value | | |
| | A19 | Value | | |
| | ... | ... | | |

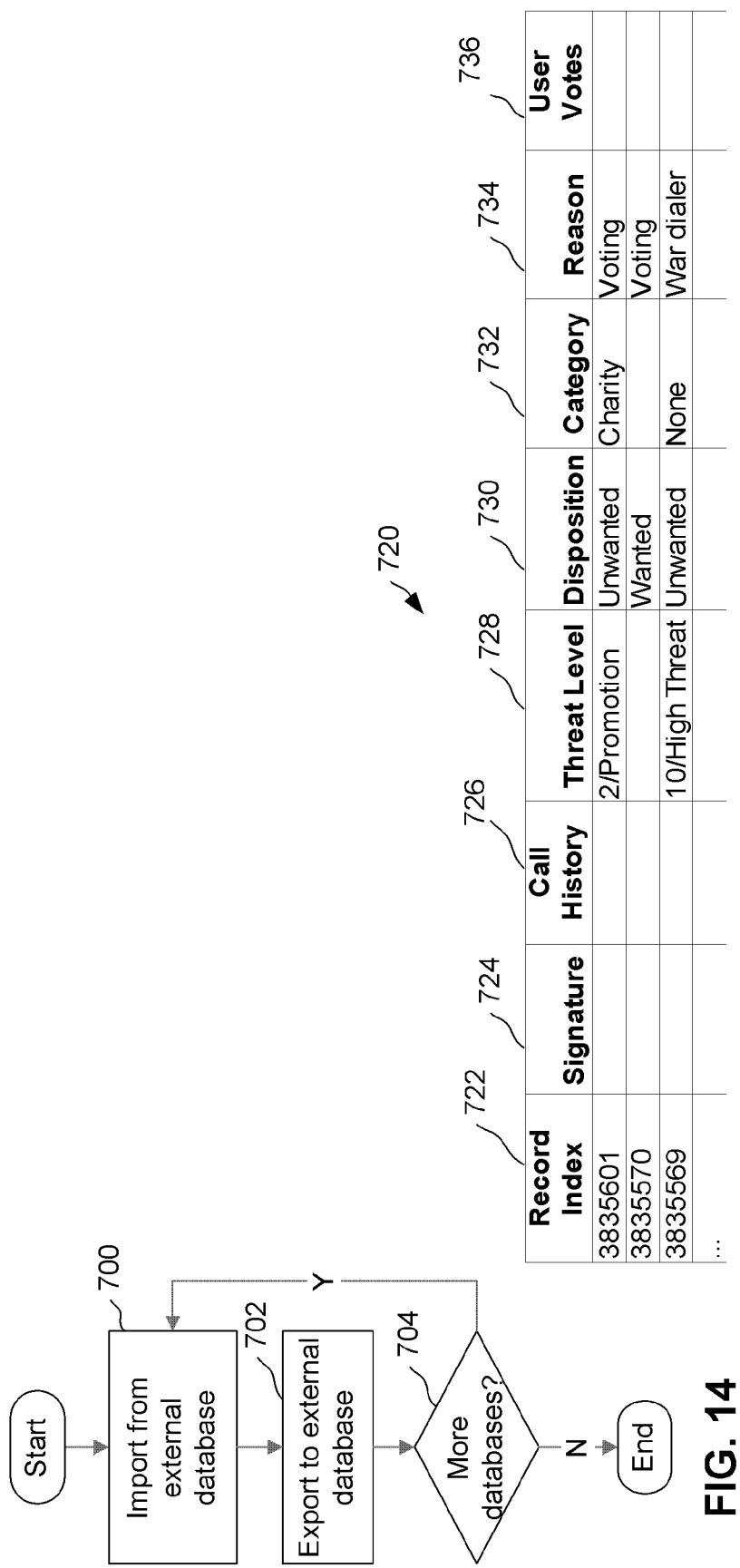

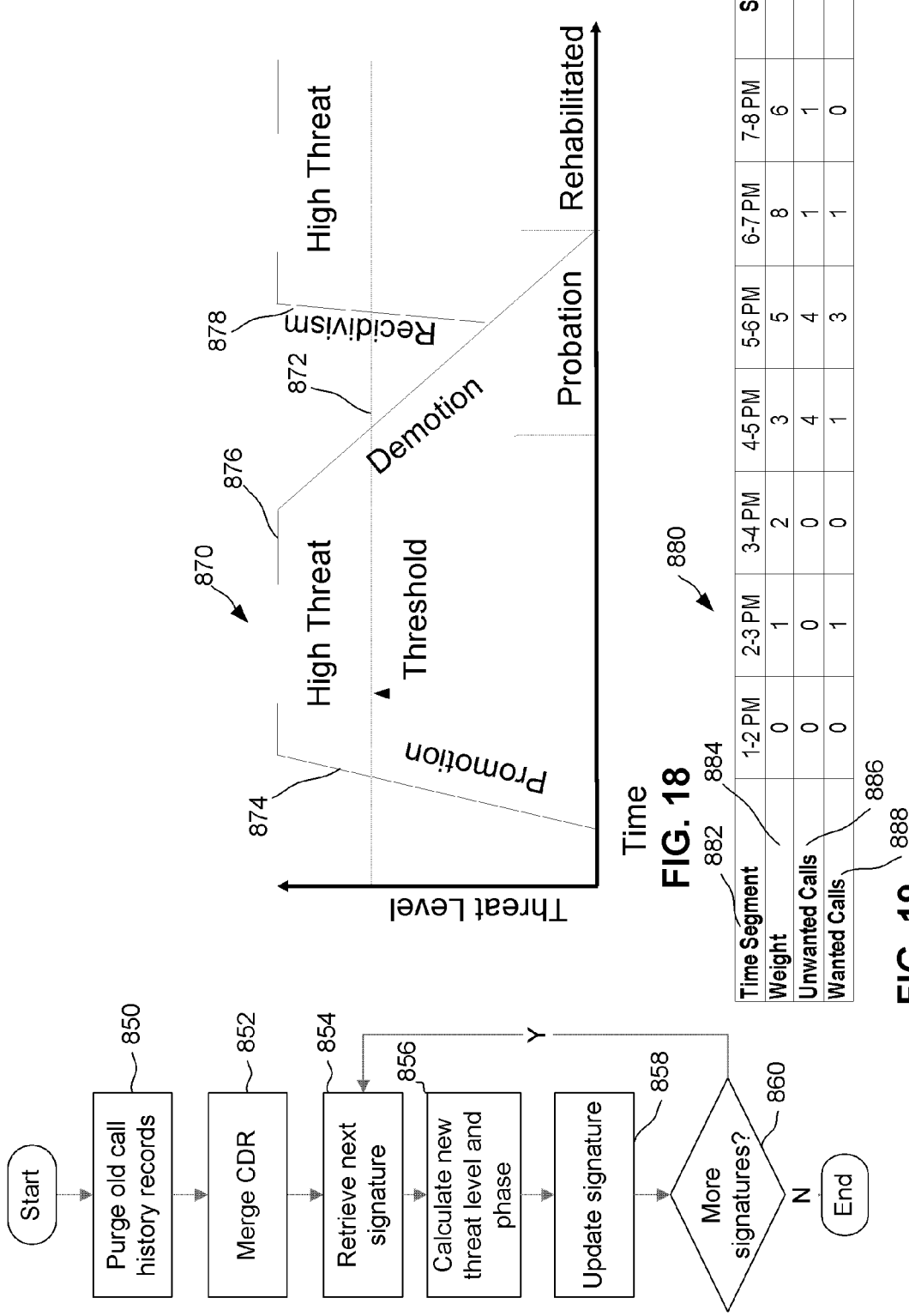

METHOD AND SYSTEM FOR INCOMING CALL MANAGEMENT

RELATED APPLICATIONS

This application claims the benefit of Provisional Application Ser. No. 60/828,128 filed Oct. 4, 2006.

FIELD OF THE INVENTION

This invention relates in general to incoming call management, commonly referred to as call screening, and in particular to a method and system for automatic incoming call management.

BACKGROUND OF THE INVENTION

Telephones are increasingly used for marketing due to cost versus success rate when compared with other advertising or sales media. Telemarketing has become a multi-billion dollar industry. As the use of telemarketing has increased, the intrusiveness and annoyance of such calls have begun to negatively impact the value of the underlying services. Consequently, many products and services are now available for screening these generally unwanted communications, and in 2003 DNC (Do-Not-Call) legislation was passed in the United States and has become one of the most popular government programs to date.

Call screening products and services have achieved some success but have been unable to meet subscriber expectations. One impact of DNC has been to reduce the volume of legal telemarketing calls, while actually increasing the volume of illegal and fraudulent calls from less ethical operators. With the introduction of internet telephony it is now possible for those operators to cost-effectively locate overseas where they can operate with impunity, and this is expected to happen.

Of course, telemarketers are frequently not the only type of unwanted calls. Even under DNC there are exempt calls that most people consider undesirable. As well, there are other categories of unwanted calls such as pranks, harassment, legal but undesired commercial contact, fraud, etc.

Screening solutions for unwanted electronic mail (e-mail) have become increasingly sophisticated and successful. Nevertheless, no long term solution has been shown to be effective because the originators of such e-mails aggressively search for and find new ways to get their messages through. In response, the e-mail screening solution providers also evolve their products to counter new tactics. However, the techniques required for screening unwanted real-time voice communications differ from those that work for e-mail. The reason is that less data is present in the initiation attempt of a real-time communications event than in an e-mail. An e-mail contains not only the addressing data that is comparable in some respects to real-time communications invitations, but also the entire content of the communication. Therefore screening of unwanted real-time communications can be significantly more challenging with respect to achieving a high level of reliability and accuracy. Further, the screening must be done in real-time so as not to delay or impair desirable communications. E-mail screening is not so constrained.

SUMMARY OF THE INVENTION

The invention therefore provides a method of managing an incoming call to a service subscriber, comprising: performing at least one real-time function test on a call offer message associated with the incoming call to build a signature for the incoming call; and using information derived from the at least one real-time function test to make an incoming call management decision to determine a treatment for the incoming call.

The invention further provides call director for making incoming call management decisions respecting incoming calls for subscribers to an incoming call management service, the call director comprising: at least one interface for receiving call control messages associated with the incoming calls; at least one interface for querying a signatures database; program instructions for performing function tests associated with various call states of the incoming calls; program instructions for building a signature associated with each of the incoming calls using results of the function tests; and program instructions for making incoming call management in decisions using information associated with the function test results.

The invention yet further provides a system for providing an incoming call management service, comprising: a call director for receiving call control messages respecting incoming calls to subscribers of the incoming call management service, performing function tests associated with various call states of the incoming calls, building a call signature associated with each incoming call using the function test results, and making incoming call management decisions based on the function test results; a subscriber's preferences database for storing subscriber preference information also used by the call director in making the call management decisions; and a signatures database for storing selected signatures built by the call director.

BRIEF DESCRIPTION OF THE DRAWINGS

Having thus generally described the nature of the invention, reference will now be made to the accompanying drawings, in which:

FIGS. 7a, 7b, 7c, 7d and 7e are a flow chart illustrating principal tasks performed by the program instructions of the Call Director while processing real-time call events in a Call Offered state;

FIG. 14 is a flow chart illustrating principal tasks performed during signature sharing in accordance with the invention;

FIG. 15 is a table illustrating an exemplary structure for a Signatures database in accordance with the invention;

FIG. 17 is a flow chart illustrating principal tasks performed during signature threat level and phase re-evaluation in accordance with the invention;

FIG. 18 is a graph illustrating a signature life cycle in the system in accordance with the invention;

FIG. 19 is a table illustrating an exemplary weighting system in accordance with the invention for re-evaluating a signature.

DETAILED DESCRIPTION OF THE PREFERRED EMBODIMENTS

Figure 1:
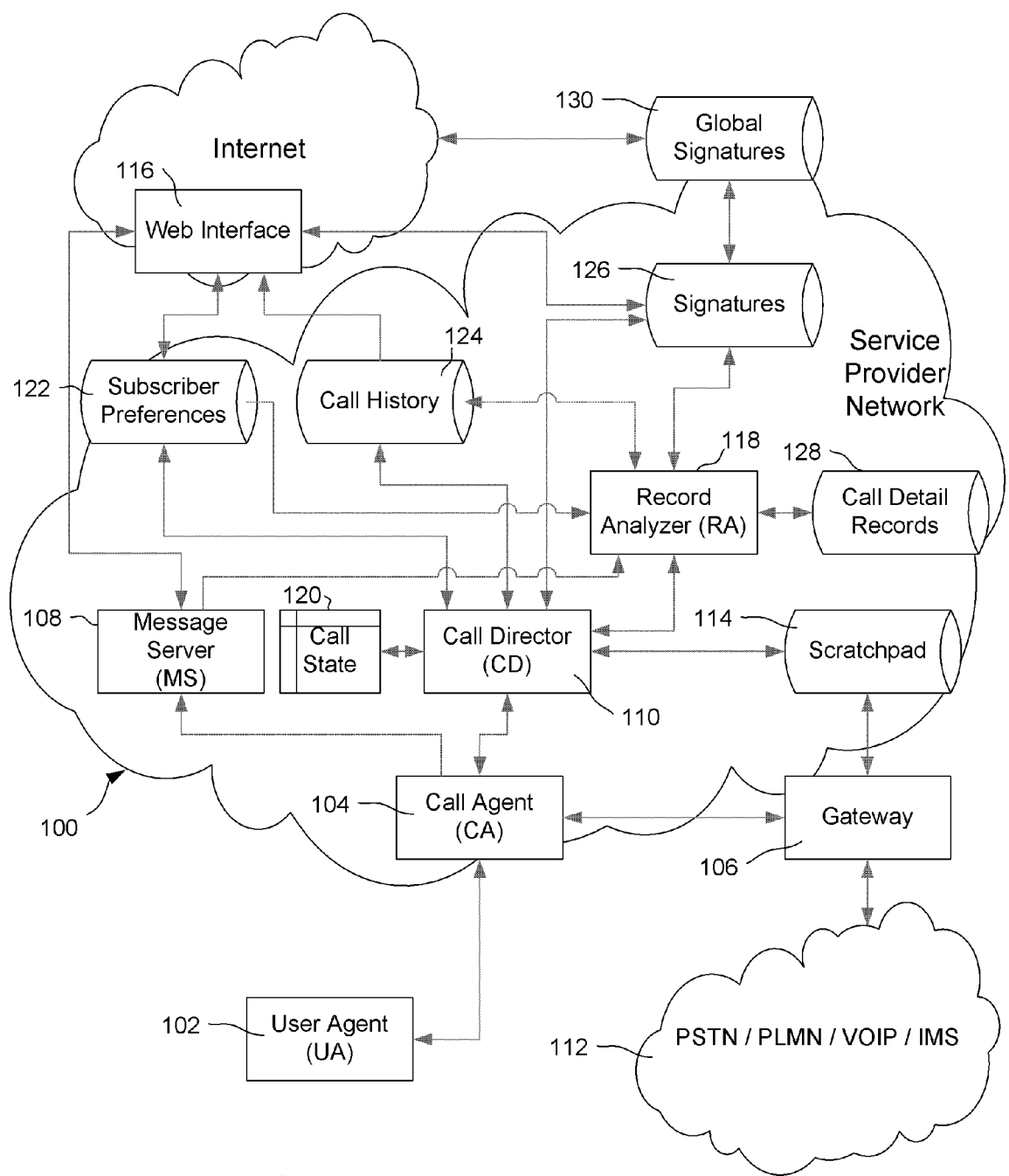
FIG. 1 is a schematic diagram of exemplary components of a system in accordance with the invention, and associated networks.

The invention provides a method and system for incoming call management for subscribers to an incoming call management service. In one embodiment, the system includes a call director that receives incoming call control messages and analyzes the call control messages to build a signature associated with the call using results derived from function tests performed at predetermined points in each call state. Information associated with the function test results is used to make an incoming call management decision about a treatment for the incoming call.

DEFINITIONS

The following terms used in this disclosure are defined as follows:

AIN—Advanced Intelligent Network (SS7).

Bad Actor—An identifiable call source exhibiting a recent history of calls with a signature of an unwanted caller to multiple parties (subscribers or non-subscribers). The identifiable source may be a verifiable calling number, IP address, IP subnet, gateway or gateway interface, or other unique identifier. Uniqueness is not always verifiable, therefore a confidence score is associated with each bad actor. Bad actors may also have a category if established by manual entry, database import or subscriber voting. Exemplary categories include: charity; political; commercial sales; fraud; etc.

CLASS—Custom Local Access Signaling Services.

Community—A group of subscribers that self-associate to automatically share their lists of unwanted and acceptable calls. These communities can be structured on relationships such as: family; friends; co-workers; or other associative relationship.

Confidence Level—A relative value associated with a scoring of suspect calls that indicates a degree of confidence in the suspect score. Confidence is influenced by volume and intensity of suspect behavior, subscriber feedback, feasible function tests, or other factors.

CSCF—Call Session Control Function (IMS).

DNC—Do Not Call database and regulations established in certain jurisdictions.

False Negative—A call that is incorrectly identified as wanted and allowed to proceed when the call should have been determined to be unwanted by the subscriber.

False Positive—A call that is incorrectly identified as unwanted and not allowed to proceed when it should have been determined to be wanted by the subscriber.

IMS—IP Multimedia Services (3GPP).

ISUP—ISDN User Part (SS7).

IVR—Interactive Voice Response.

MS—Message Server or Media Server.

MSF—MultiService Forum.

NAT—Network Address Translation.

Negative—A call that is identified as acceptable wanted within confidence bounds set by a subscriber and a service provider.

Non-user—A subscriber to telephone services provided by the service provider, but not a subscriber to the incoming call management services in accordance with the invention.

Phishing—Form of attack in which the victim is persuaded to disclose private data.

Positive—A call that is identified as unwanted within confidence bounds set the by a subscriber and a service provider.

PRI—ISDN Primary Rate Interface.

SDP—Session Description Protocol (IETF RFC 2327).

Service Provider—A provider of incoming call management services in accordance with the invention.

Signature—A set of characteristic data derived from caller behaviors, caller and called attributes, associated with both wanted and unwanted calls.

Signature Database—A collection of signatures and their call histories to which the system in accordance with the invention refers when deciding that a call is wanted or unwanted.

SIP—Session Initiation Protocol (IETF RFC 3261 and other specs).

Spit—Spam over Internet Telephony.

Subscriber—A customer of the service provider. Each subscriber can have one or more appliances and one or more numbers which are considered to be a single entity for the purposes of the invention.

URI—Universal Resource Identifier (IETF RFC 3986).

Wangiri—Coined term (Japanese) for a class of telephone phishing attacks.

Zombie—Compromised computer (bot) exploited for spam, spit, and other attacks.

System Hardware

FIG. 1 is a schematic diagram of a system for providing incoming call management services in accordance with the invention deployed in a service provider's network 100. As will be understood by those skilled in the art, components of the service provider network 100, aside from those required for the provision of call incoming call management services in accordance with the invention are not shown.

A User Agent (UA) 102 is a subscriber's appliance, device or software with which real-time communications are conducted. The UA 102 has signaling and media capabilities, for voice, video, text, or other types of communications with other parties. The UA 102 utilizes call control signaling protocols as appropriate to the communications service and a serving Call Agent (CA) 104 or, where applicable, a peer-to-peer protocol for direct communication with other UA's 102 (not shown). UA 102 protocols include, for example, CLASS (Telcordia GR-30), SIP (IETF RFC 3261), H.323 (ITU-T).

The UA 102 may also be a virtual or physical device that is deployed as a "honey pot". Honey pots are unpublished UA addresses where the UA 102 operation is automated to assist in the determination of whether an incoming call is from a bad actor. As is well known, calls may originate due to an address improperly specified by a legitimate caller (i.e. misdialed number), and these must be distinguished. The honey pot exhibits a specified behavior designed to elicit suspect behavior on the part of the caller. This can include: never answering; rejecting all calls; rapid answer combined with listening to a caller response; always deflecting to a Message System or announcement; etc. The results of these calls are analyzed as with other calls, with the key difference being that the treatment is predetermined and the confidence level of any function tests can be set higher than normal. Honey pots can accelerate the promotion of a signature so that subscribers can successfully screen more calls from unwanted callers.

The Call Agent (CA) 104 is typically located in the service provider's network 100. The call agent 104 provides real-time communications services to UAs 102 and is responsible for the call control signaling with the UAs 102 and network components to direct the offering, modification and termination of real-time communications sessions. The CA 104 performs these and related services for subscribers and for other parties that wish to communicate with the subscribers. The CA 104 may support one or more call signaling protocols for communicating with various UAs 102, other CAs 104, network Gateways 106, Message Servers 108 and other components, and facilitates protocol message mapping between such protocols, as required. CAs 104 are of many types, including: PSTN switches and SSP's (Nortel DMS-100 or Lucent 5ESS); PacketCable CMS; IMS CSCF (Nortel CS2000); Soft Switch (Metaswitch); and other products commonly deployed in service provider networks.

For the purposes of this invention the CA 104 is connected to and in communication with a Call Director (CD) 110. The CA 104 interrupts call processing to send a copy of all call control messages associated with real-time communications sessions, such as telephone calls, to the Call Director 110. In certain cases the CA 104 receives instructions about how to proceed with a call from the Call Director 110. In real-time communications services time is of the essence, and it is permissible for the CA 104 to either repeat a call control message transmission or continue with a call handling operation without further waiting for a response from the Call Director 110 if a required response is not received within a predetermined time interval.

The CA 104 may be configured to communicate with the Call Director 110 only for calls to and from subscribers. Alternatively, the CA 104 may send call control messages associated with all calls to the Call Director 110 in order to tune screening algorithms, as will be described below in more detail. The Call Director 110 is not obliged to fully process all call control messages and may be configured to ignore any call control message for any predetermined reason, even call control messages associated with subscriber's calls, due to error, congestion management or any other reason. Unprocessed messages may be ignored by the Call Director 110, or the Call Director 110 may instruct the CA 104 to continue processing the call in a normal way.

The CA 104 communicates with the Call Director 110 using a suitable communications protocol, such as: LDAP; RADIUS; DIAMETER; SIGTRAN; etc. Alternatively, the CA 104 may use a protocol native to the call control protocol in use, which may be: SIP, as used in 3GPP IMS between a CSCF and Service Brokers, or the equivalent in Multi-Service Forum's Call Agent to Service Broker specifications (MSF-IA-SIP.005); AIN 0.1 (Telcordia TR-NWT-001284 and 1285); or another protocol including those unique to a particular CA 104 product. The CA 104 may also use a load distribution algorithm to select one of a plurality of Call Directors 110, such as round-robin, to select one of those Call Directors in case of failure, congestion or other reason which is detrimental to high-availability applications. The algorithm must be stateful, so that once a Call Director 110 is selected for a given call all subsequent call control messages associated with that call are delivered to the same Call Director 110. Every CA 104 is typically logically interconnected with one or more other CAs 104 and network Gateways 106 in the service provider network 110.

Gateways 106 are call control and media relaying entities that are located at the boundary of the service provider network 110 and are typically used to interconnect with other service provider networks to enable subscribers in a plurality of networks to communicate world-wide. Gateways 106 provide a variety of services, the majority of which are not relevant to the present invention and are not described.

One Gateway 106 function of importance is the Gateway's common use as a protocol converter for translating between a call signaling protocol used within the service provider network 100 and a signaling protocol used by an interconnected network 112. For maximum effectiveness of the call screening functions, it is desirable, though not mandatory, that the Call Director 110 have access to untranslated messages received from the interconnected network. In one embodiment, the original message is encapsulated in the translated message using a standard encoding procedure, such as a MIME attachment described in IETF RFC 3204, or a signaling tunneling procedure as described in H.323. In another embodiment, the Gateway 106 writes the original message to a record in a Scratch pad memory 114 where it can be accessed by the Call Director and other system components. Whether retrieved or not, such records are deleted by the Scratch pad memory 114 after a short interval beyond which the original messages are no longer of utility, in order to preserve maximum efficiency of system operation.

In another embodiment, the CA 104 may be combined with the UA 102 without loss of functionality to access the call screening services in accordance with the invention. One example of where this has utility is a peer-to-peer services where there is no intervening service provider. In another instance the CA 104 may be located outside of the service provider network 100 for a similar purpose as in the peer-to-peer embodiment, but where the CA 104 provides services to more than one user, such as in a PBX serving an enterprise.

The Message Server (MS) 108 records messages in an appropriate format, such as voice, video, text or other media, when the service provider or subscriber directs calls to it. The MS 108 is a common device presently deployed. In this invention the Call Director 110 may instruct the CA 104 to deflect a call to the MS 108 when the call is suspected of being unwanted by a subscriber. The subscriber may designate a separate mailbox for such calls. The subscriber can access and play those messages by initiating a call to the MS 108 or making a request via some other interface, such as a web interface 116, in a manner well known in the art. Those messages may also be retrieved and analyzed by the Call Director 110 or a Record Analyzer 118, the function of which will be described in more detail below. The Call Director 110 and the Record Analyzer 118 are therefore provided with an interface to the MS 108 so that recorded messages can be searched, retrieved and optionally deleted by subscriber identifier, call identifier or other index. Recorded message retrieval may be initiated asynchronously by the Call Director 110 or as prompted by the MS 108, which may notify the Call Director 110 when a caller leaves, or fails to leave, a recorded message. This retrieval, analysis, optional deletion and notification can be performed for all recorded messages left for all users, messages left only for subscribers, or some combination of the two as determined by the service provider in accordance with Subscriber Preferences.

The Call Director 110 performs real-time call, message and behavior analysis, and tracks call progress from the time the call is offered until the call terminates. The Call Director evaluates all available signaling data and caller behavior, and compares those to previously discovered suspect behaviors, to derive a suspect score with a confidence level for each call. This is done at each major call stage, including when the call is first offered, when one party disconnects, or when signaling messages are received mid-call. The Call Director 110 maintains a record of each active call it is tracking including a call state, a content of signaling messages and the results of every test and evaluation performed. These records are kept in a Call State database 120.

Based on the tests and evaluations, the Call Director 110, after consulting service provider and subscriber preference parameters stored in a Subscriber Preference database 122, call history stored in a Call History database 124, and Signature information stored in a Signature database 126 may intervene to alter the progress of the call. This is accomplished by sending instructions to the CA 104 about what action to take. These instructions may include any one of: rejecting the call; deflecting the call to the Message Server 108 to play an announcement or invite the caller to leave a message; inviting the caller to announce their identity in a media of the communication, such as voice, which the subscriber can verify and then accept or reject; inviting the caller to enter a security code such as a digital certificate or a string of DTMF digits; etc.

The Call Director 110 updates the Call History database 124 with its evaluation results and call details for every call it tracks, and updates the Signatures database 126 with any signatures it creates for callers with suspect behavior. These data records are then available for evaluating future calls, whether the call is placed to the same subscriber or to other subscribers.

All determinations of call disposition are subject to Subscriber Preferences, which are stored in the Subscriber Preferences database 122. The stored data includes white lists, black lists, dynamic white lists, and treatments to be used for each of the various evaluations made by the Call Director 110. The service provider also keeps its default threshold levels and call treatments in the Subscriber Preferences database 122, which each subscriber can choose to use or override.

Information about calls made by or to each subscriber is stored in the Call History database 124 by the Call Director 110, along with the results of any tests and evaluations performed. In some embodiments the Call History database 124 may also contain records of all calls processed by the Call Director 110, including calls to non-users.

Both subscribers and service providers can access the Subscriber Preferences database 122, Call History database 124 and Signatures database 126 using the web interface 116, for purposes of searching, displaying and, if permitted, modifying their content. The web interface 116 provides commonly understood security and privacy capabilities to limit the scope of operations available and to protect access to sensitive data. It is also understood that the web interface 116, while implying a system that utilizes HTTP, HTTPS, Java, personal computers and browser software, can also be an IVR (Interactive Voice Response) system or other system that permits the required operations, each being well known in the art.

The Call Director 110 is also responsible for all real-time analysis of signatures for all communications in the service provider's network. This analysis includes: storing new signatures; updating the call history associated with existing signatures; determining which signatures are associated with an identifiable bad actor; evaluating a confidence level associated with each evaluation and signature; and, adjusting constraints on signature attributes to improve a validity of a signature as it relates to suspect behavior on the part of a caller. In cases where the Call Director 110 is not dependent on a real-time response for these activities and is otherwise not immediately dependent on the outcome, it may request that the Record Analyzer 118 perform such activities.

The Record Analyzer 118 acts as an adjunct to the Call Director 110 for call analysis and other tasks that are not real-time critical, and can be performed in near-real time or some time after the analyzed events occurred and the analyzed data was received or created. This segregation of responsibilities allows the allocation of processor, memory and other resources where required, and prevents performance impairment of real-time tasks performed by the Call Director 110. If the Call Director has task scheduling capabilities that ensure that real-time tasks are not impaired and that there adequate resources for all call analysis, the tasks described for the Record Analyzer 118 can be performed by the Call Director 110.

The Record Analyzer 118 performs several near-real time and background tasks that contribute to the determination of the onset, continuation and end of suspect behavior. When a subscriber directs a caller with suspect behavior to the MS 108, after the MS 108 and Call Director 110 determine that the caller has recorded a message, the MS 108 or Call Director 110 may notify the Record Analyzer 118. The Record Analyzer 118 then retrieves the recorded message and evaluates the message for suspect behavior in combination with any associated signature data. In accordance with one embodiment of the invention, subscribers can use the web interface 116 to cast a vote respecting whether any given call was wanted or unwanted. A subscriber vote may conflict with the results of the various evaluations performed by the Call Director 110 and the Record Analyzer 118. Any subscriber votes are tabulated by the Record Analyzer 118 to determine if the votes associated with an identified signature are of significance. The Record Analyzer 118 ensures that the voting system is not abused as a result of error or malice, as will be described below in more detail. The Record Analyzer 118 may override subscriber votes, but records all voting activity and updates any signatures affected in the Signatures database 126.

The Record Analyzer 118 determines when a signature exceeds a threat level threshold and becomes a high threat caller (bad actor) subject to aggressive screening, such as escalation to a human operator. The Record Analyzer 118 also determines when suspect behavior by a specific caller has declined or stopped, and then reduces the threat level. If there has been no bad actor behavior from a caller for a predetermined period of time, the Record Analyzer 118 may remove the caller's signature from the Signatures database 126.

In another background task the Record Analyzer 118 may supplement calls being analyzed with calls to non-users that are recorded in one or more of the Call Detail Records (CDR) 128 databases maintained by the service provider for billing and other purposes. This further analysis is used to increase confidence in the threat level of signatures by analyzing a larger volume of calls that may display suspect behavior.

CDR 128 analysis can be performed for all calls, or by sampling a predetermined proportion of calls, as will also be described below in more detail.

Since the confidence in the threat levels of signatures generally increases with the volume of calls that are analyzed, the records of the Signatures database 126 can be shared Signatures databases (Global Signatures 130) of other service providers. Such sharing increases the speed with which suspect behavior can be dealt with by allowing a service provider to intercept calls from bad actors before they reach subscribers.

System Operation

Figure 2:
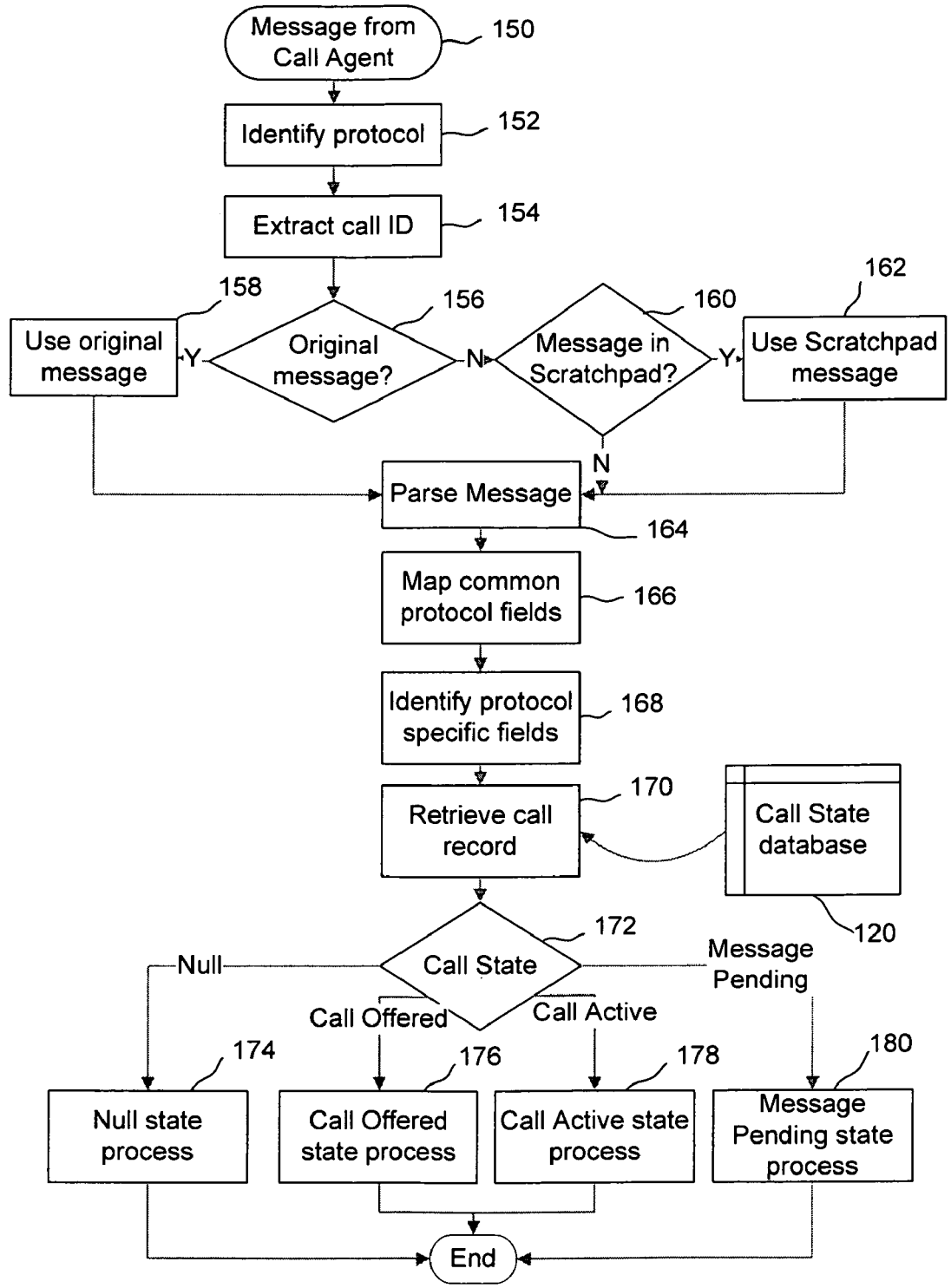
FIG. 2 is a flow chart illustrating principal tasks performed by program instructions for a message preprocessor function of a Call Director in accordance with the invention.

FIG. 2 is a flow chart illustrating principal tasks of a message preprocessor function of the Call Director 110. On receiving a message from the CA 104 (150), the Call Director 110 must first identify the protocol (152) in which the message is encoded. This is required to enable support for a broad range of call control protocols that may be used, including those used in other networks. Each Call Director 110, may be connected to multiple CAs 104, and each CA 104 may support a different call control protocol.

If communications between the Call Director 110 and CA 104 is a transaction protocol, transaction messages are exchanged in which the call control message has been encapsulated as a payload. If so, the call control message is extracted, and if necessary an acknowledgment may be sent to the CA 104, as is common in transaction protocols. Of course, the call control message may be sent from the CA 104 to the Call Director 110 in the call control message protocol as well.

The call control message is scanned to identify the protocol, or the protocol may be indicated by an explicit identifier that is embedded in the message. If a CA 104 always uses one call control protocol, the protocol identification can be further simplified by setting by provisioning the Call Director 110 with a default call control message protocol for that CA 104.

The call control message uniquely identifies the call or session of the real-time communications. Once the protocol is known, the Call Director 110 extracts the call identification (call ID) (154). The field or parameter where the call ID is found can be located by parsing the message. Examples of the call ID are the Call Reference Value or Call ID in H.323/H.225, and the Call-Id in SIP.

To determine if the message is associated with an ongoing call the Call Director uses the extracted call ID to retrieve the call record in the internal Call State database 120. If no record exists, the call is a new call and a new record for the call is created and stored in the Call State database 120.

If the call control message is an original message, i.e. in the originating protocol (156), the Call Director uses the original message (158). Using the original message improves the effectiveness of the screening and signature algorithms since there is always some loss of relevant information when a message in one protocol is mapped or translated to another protocol. This occurs, for example, when a particular field or parameter exists in one protocol but not in the other because the other protocol does not include the same field or parameter. Since a UA 102 may connect to different networks utilizing different protocols, and a communications session may transit via one or more networks, each utilizing their own internal protocol, much information can be lost as call control messages are relayed and converted from one protocol to another. In accordance with the invention, encapsulation of the original message is performed by the Gateway 106 which is typically the first point of contact with messages incoming from other networks and is often responsible for translating such messages into the protocol used within the service provider's network 100.

If the original message is not received by the Call Director 110, the Call Director queries (160) the Scratchpad database 114, using the call identifier and message type. If the response from the Scratchpad database 114 indicates that the original message was successfully located, the Call Director 110 uses the original message stored in the Scratchpad database 114 in rather than the call control message received from the Call Director 110.

On receipt of certain types of call control messages the Call Director 110 may not query the Scratch pad database 114 if additional information is of little or no value. Examples include the SIP Bye message and ISUP Release message, etc.

The call control message is decomposed into its component parts by a parser (164) suited to the protocol in which the message is encoded. Parsing separates the various fields and encodes them in a form that is convenient and efficient for further processing. The parsed message structure is an abstract form where call control message fields are mapped into a common set of protocol-independent fields (166). For example, "message type" of an SS7 IAM and a SIP Invite map to the same value. As another example, the "calling number", where an SS7 Calling Number parameter that is "user-provided" and the URI part of a SIP From field are mapped to the same value. It should be understood that these examples are exemplary only and need not be used as there are many other ways of mapping call control messages in different protocols to a protocol-independent format. Even where the mapping to one field type is not technically exact, it may still be desirable to do so, and is therefore permitted, to more consistently identify suspect behavior and create signatures if a bad actor uses a plurality of networks and protocols.

Fields and parameters that cannot be reliably mapped to protocol-independent format are identified as protocol-specific fields (168). However, a protocol-specific field may also be mapped into a protocol-independent format. It is also permitted to map non-common fields and parameters that appear in messages from variants of a protocol, such as the various standard and proprietary dialects of SIP 2.0 or SS7 ISUP (ANSI, ETSI, ITU-T, etc.) to achieve a high degree of commonality in the parsed message.

Once fully parsed and mapped to the protocol-independent data structure, the contents of the call control message are available for call processing by the Call Director 110. The Call Director 110 therefore retrieves the call record (170) from the Call State database 120 and determines the call state (172). If the call state is Null, the Call Director performs a Null state process (174), as will be explained below with reference to FIG. 6. If the call state is Call Offered, the Call Director performs Call Offered state process (176), as will be explained below with reference to FIGS. 7a-7e. If the call state is Call Active, the Call Director performs Call Active state process (178), as will be explained below with reference to FIGS. 8a-8c. If the call state is Message Pending, the Call Director performs Message Pending state process (180), as will be explained below with reference to FIGS. 9a and 9b.

Figure 3:
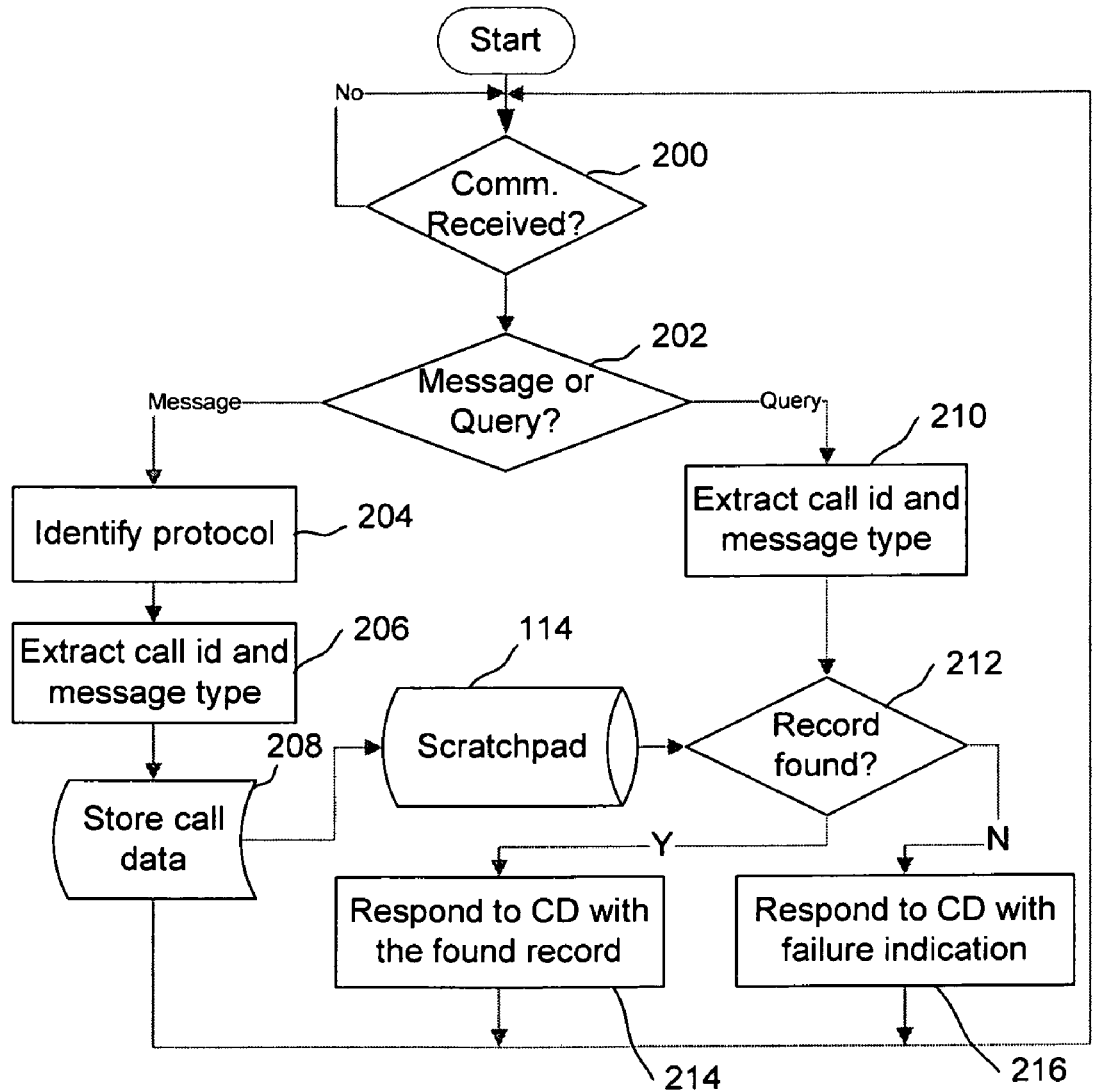
FIG. 3 is a flow chart illustrating principal tasks performed by a scratchpad database maintenance algorithm.

FIG. 3 is a flow chart illustrating principal tasks performed by a scratch pad database maintenance algorithm in accordance with one embodiment of the invention. When the Scratch pad database 114 receives a communication (200) the algorithm determines (202) whether the communication is a query received from the Call Director 110 or a call control message received from the Gateway 106. If the communication is a call control message, it is a call control message that was received by the Gateway 106 from another network 112. The Gateway 106 does not expect a response from the Scratch pad database 114 when it sends it a call control message, however the Scratch pad database 114 must store each call control message it receives from the Gateway 106.

Each stored call control message is indexed by call ID and message type. To achieve this, the protocol of the call control message must first be identified (204). Following this the call ID and message type can be extracted (206). Parsing the message is performed in a way that is similar to that described above with reference to the Call Director 110. The message along with its index fields in stored in the Scratch pad database 114.

When a query is received from the Call Director 110 it contains a call ID and message type, used to index the call control message records in the Scratchpad database 114. This information is extracted from the query (210) and used to search (212) the Scratchpad database records. If the search is successful (214) the retrieved message is returned to the Call Director 110. If the search is unsuccessful (216) a failure indication is returned to the Call Director 110. The process then returns to (200) to monitor for receipt of a next communication. In this way the Call Director 110 has access to call control messages incoming from other networks 112 in the original protocol.

When available, a unique identifier of the Gateway 106 or, in preferential order, the adjacent network 112 or caller's local network (not shown) is also sent by the Gateway 106 to the Scratch pad database 114 for storage and on-demand transmittal to the Call Director 110. This permits increased accuracy in the determination of the caller source when there are proxies and NAT devices in the signaling and/or media paths.

The lifetime of records stored by the Scratch pad database 114 is relatively short. At frequent intervals the database is purged of records that have been stored longer than a predetermined threshold provisioned by the service provider. This process is not illustrated. Typically, this threshold is less than one minute. This limits the number of stored records, permitting rapid searches and minimal delay in call processing by the Call Director 110.

Figures 4, 5:
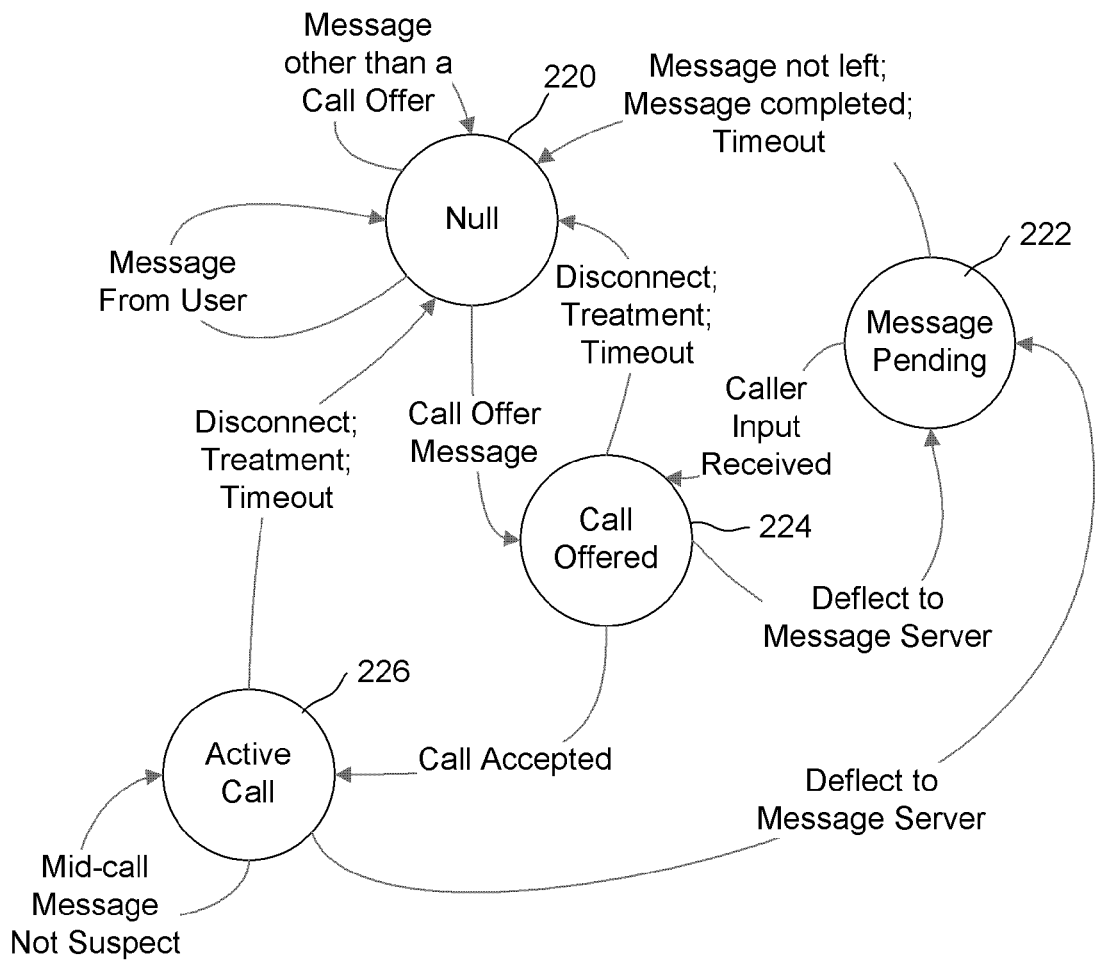
FIG. 4 is a state diagram illustrating the Call Director's call state transitions to provide an overview of real-time event processing.
FIG. 5 is a table illustrating an exemplary structure for a record in a Call State database in accordance with the invention.

FIG. 4 is a state diagram illustrating the Call Director's 110 call state transitions, with an overview of real-time event processing of the various call states. The Call State database 120 is used by the Call Director 110 to store a record for every call. As previously described the Call Director 110 maintains knowledge of a current call state for every call that it monitors and analyzes. Each record contains the call state and results of evaluations performed by the Call Director 110.

To enable the appropriate call state transitions and reaction, the Call Director 110 must know if a call control message is from, or to, a subscriber. This requirement is not unique to this invention and is required by certain protocols designed for applications where a CA 104 is in communication with another entity that provides services to subscribers. Such protocols include the Multiservice Forum's MSF-IA-SIP.005 for CA 104 communication with a Service Broker where the "role" parameter designates whether the message is originating from or terminating to a subscriber, and further defining the identity of the subscriber. Similarly, SS7 AIN 0.1, Telcordia TR-NWT-001284 and 1285, provide similar data by means of a trigger invoked, such as a Termination Attempt Trigger, and the telephone number of the user. If the CA 104 sends all call control messages to the Call Director 110, regardless of whether the messages are associated with subscriber calls, the Subscriber Preferences database 122 can be queried using both the caller and calling party ID. If the query is successful the message is associated with a subscriber to the call screening service.

When a call is initiated by the reception of a call offer message for a call that is not already known to the Call Director 110, which is indicated by a call identifier which is not in the Call State database 120, and the call is incoming to a subscriber, the call details are stored in the Call State database 120, along with a state of Call Offered (224). Any message associated with a call that does not have a record in the Call State database 120, other than a call offer message, is discarded because it has been received in error or is associated with a call record already deleted. Any call offer message from a subscriber is used to create and maintain a dynamic white list, but such calls are otherwise not recorded or monitored.

A call in the Call Offered state that is abandoned by the caller or rejected by the subscriber using a disconnect or similar message, or is disconnected or deflected to an announcement as part of treatment following analysis by the Call Director, returns to the Null state (220). That is, the call is removed from the Call State database 120 after the Call Director has completed its call analysis.

A call in the Call Offered state (224) that is deflected to the Message Server 108, due to treatment following analysis by the Call Director 110, to invite the caller to leave a message, to enter a security code, to speak their name or for other such screening requiring the Message Server 108, enters the Message Pending state (222). If the caller input is received and accepted, the call state returns to the Call Offered state (224) to permit call processing to continue. If the caller is invited to leave a message, the Call Director 110 polls the Message Server 108, or is notified by the Message Server 108 when the message is available or the caller has opted to not leave one, and the message is analyzed and the call transitions to the Null state (220) and is removed from the Call State database 120.

When a call is accepted by the subscriber, as indicated by a corresponding call control message, such as an ISUP Answer message or SIP ACK response with a 2xx code, the call state transitions to the Call Active state (226), and communications between the calling and called parties is then assumed to have begun. Timing of call duration begins at this point.

When a call control message is received indicating that the call has ended, such as a SIP Bye or Cancel message, the Call Director 110 performs an end of call analysis and the call state transitions to the Null state (220), and is removed from the Call State database 120.

While a call is in the Active Call state (226) but before it terminates, additional messages associated with the call may be received by the Call Director 110. In some instances these messages are ignored and the call state remains unchanged. In other instances the Call Director 110 evaluates the messages, and if the evaluation result is not suspect the call state remains unchanged. However, if the result of this evaluation is suspect the Call Director 110 may end the call or deflect the call to the Message Server 108. If the call is deflected to the Message Server 108, the functions performed by the Message Server 108 are as described above for the Call Offered state (224).

From any call state there is a transition to the Null state (220) if the call remains in that state until the expiry of a timer that is started when the state is entered. This protects against orphaned calls for which one or more messages have been lost, and frees resources for calls that have been in a given state long enough, especially the Active Call state, when no further analysis is required. For example, a call that has been in the Active Call state (226) for longer than one minute, or some other predetermined duration, can be assumed to be a call that is wanted by the subscriber.

If the call record is removed from the Call State database 120, the Call Director 110 may first move results of its evaluations to another database for long term storage, such as the Call History database 124 or the Signatures database 126, as will be described below with reference to FIGS. 6-9.

FIG. 5 is a table illustrating an exemplary structure (230) of records in the Call State database 120 in accordance with an embodiment of the invention. The User ID field (232) contains the call ID obtained from the call offer message, which is the first message received for a call. The call ID does not change during a life of the call. This field (232) is the primary index for storing, modifying, retrieving and deleting records from the Call State database 120. The call state (234) is another field in the database record. The remaining fields in the record are used to store results of evaluations performed by the Call Director 110. As shown, a set of evaluation results is associated with each call state since these evaluations may occur when entering or leaving the call states, as will be further described below. These results include a signature for the call, function tests, suspect score and confidence level associated with the suspect score, and one or more signature identifiers in the Signatures database 126 that matches the call's signature.

Figure 6:
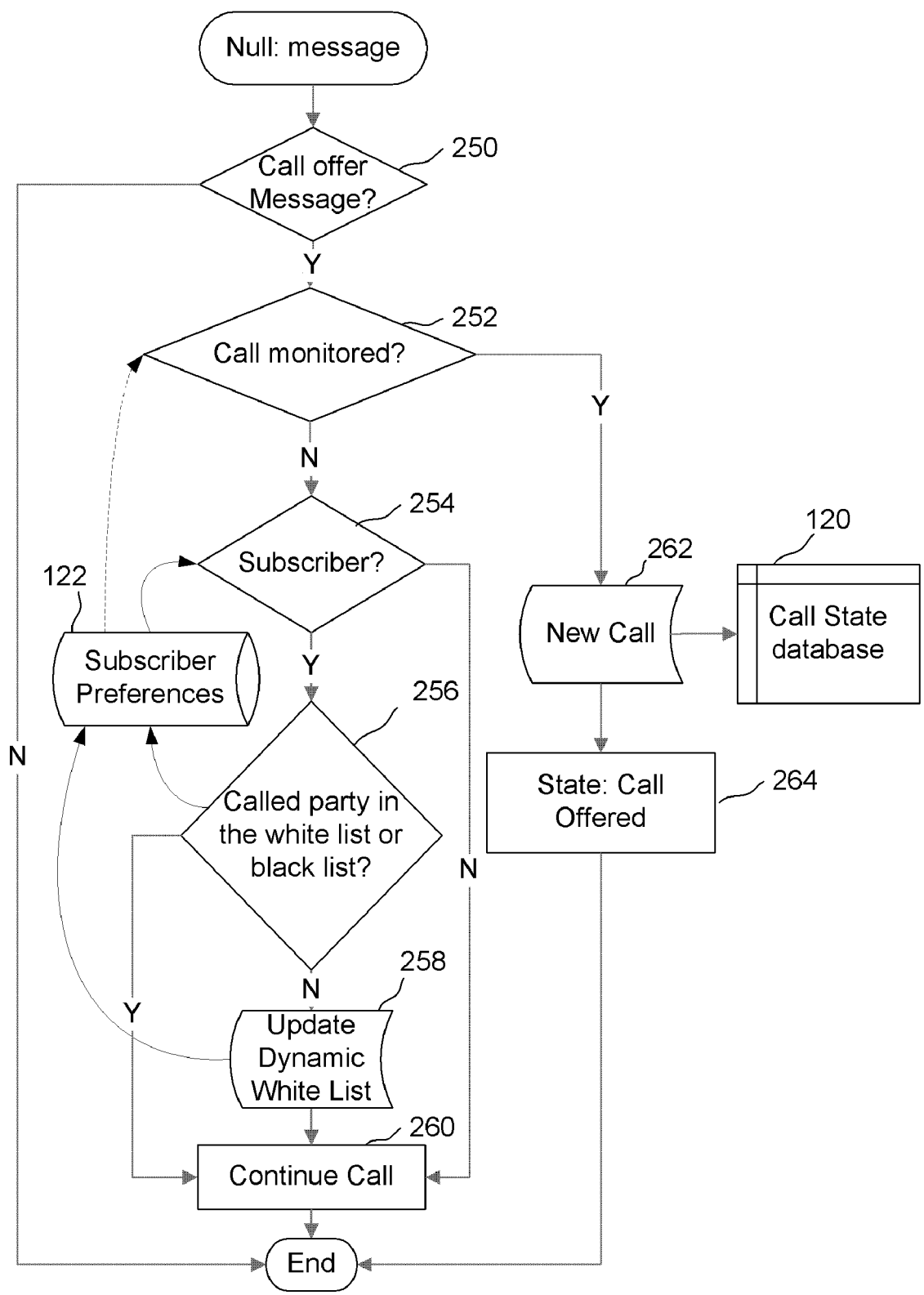
FIG. 6 is a flow chart illustrating principal tasks performed by program instructions of the Call Director while processing real-time call events in a Null state.

FIG. 6 is a flow chart illustrating principal tasks performed by the Call Director 110 while processing real-time call events in a Null state. A call is in the Null state when the call ID is not associated with any record in the Call State database 120. The only call control message that is processed in the Null state is a Call Offer message, as determined at (250). If any other type of call control message is received, the Null state process ends. Typical situations where other than a Call Offer message is received by the Null state process include: a call control message associated with a preceding Call Offer message that was lost; and, the Call Director 110 previously determined that a call no longer required monitoring, and deleted the call record from the Call State database 120. If a call record is not found in the Call State database 120, the Call Director 110 may instruct the CA 104 to continue call processing when the CA 104 requires a response to a call control message sent to the Call Director 110.

The Call Offer message may be received from a subscriber's User Agent 102 or a User Agent of a non-user on the "line side" of the CA 104, or from a calling party served by another CA 104 or another network 112. Each time a Call Offer message is received, the Call Director must determine whether the call is to be monitored (252). Calls originated by subscribers are not entered in the Call State database 120 and are not monitored by the Call Director 110 unless a called party associated with the call is also a subscriber. Also, as noted above, for better screening accuracy all inbound calls to users served by the Call Director 110 may be monitored as a matter of policy set by the service provider. Consequently, whether a call is monitored requires determining whether it originated from the line side of the CA 104, as well as whether the called party is a subscriber. The decision made (252) may therefore require that a query be sent by the Call Director 110 to the Subscriber Preferences database 122 to determine whether the called party is a subscriber.

If the call is not to be monitored, it is determined (254) whether the calling party is a subscriber. Determination of whether the calling party is a subscriber is accomplished by querying the Subscriber Preferences database 122 using the calling party ID as a key. A Call Offer message received from a UA 102 operated by a subscriber (254) is used to maintain a "dynamic white list" for the subscriber if the subscriber's record in the Subscriber Preferences database 122 indicates that a dynamic white list is to be maintained. Any caller ID in a subscriber's dynamic white list is allowed to complete a call to the subscriber. Should a subscriber opt to not have a dynamic white list, or if the identity of the called party is already programmed into the subscriber's permanent "white list" (wanted callers) or "black list" (unwanted callers) (256), update of the dynamic white list (258) is not performed. Dynamic white list management does not require input by the subscriber, but does allow the subscriber to delete entries from the list using the web interface 116 or some other interface provided for maintaining that list.

If the called party's identifier is not in either the dynamic or permanent white list, or the subscriber's black list, a dynamic white list record is written to the Subscriber Preferences database (122), including a time of the call offer. If the called party's identifier is in the dynamic white list, the record is updated with the time of the current call offer (258). The purpose of recording the call offer time is to permit aging of entries in the dynamic white list. Entries in the dynamic white list that have not been updated for at least a period of time specified by the service provider or the subscriber are deleted. This ensures that only parties recently contacted by the subscriber are permitted to pass screening based on the dynamic white list. This increases a probability that calls from such parties are wanted.

A lifetime of dynamic white list entries can be optionally extended by weighting the entries based on the quantity of calls to the called party. In one embodiment, an initial entry is given a lifetime of 1 week, and each additional call to that party adds 1 week, up to a maximum of 4 weeks, with the lifetime measured from either the initial or most recent call. Other algorithms can also be used for the same purpose.

The lifetime of dynamic white list entries can further be optionally reduced if the Call Director 110 or subscriber feedback indicates that a call from a caller in the dynamic white list is unwanted. To prevent inadvertent removal of a caller ID from the dynamic white list due to a single instance of suspect behavior, such as an accidentally rejected or dropped call, the lifetime can be reduced in similar increments to those described above for lifetime extension. When reduced to zero the dynamic white list record is deleted. For direct subscriber feedback such as explicit marking of a call from such a caller as unwanted, the dynamic white list record may be deleted immediately, regardless of any remaining lifetime.

In addition to its use as a call screening tool, the dynamic white list, is also used in the validation of subscriber feedback, as will be described below. Consequently, even if the subscriber does not opt for a dynamic white list, the dynamic white list may still be maintained as described above. However, that dynamic white list will not be visible to the subscriber, nor will it be used to screen calls to the subscriber, but it will be available for validating feedback from that subscriber regarding the status of calls from callers.

Following real-time management of the dynamic white list in response to Call Offer messages originated by a subscriber, the Call Offer message is discarded and the CA 104 is instructed to continue the call (260).

If the Call Offer message is to be monitored (252), it is a new call (262) and a call record is created in the Call State database 120. The call then transitions to the Call state: Call Offered (264).

FIGS. 7a-7e are flow charts illustrating principal tasks performed by the Call Director 110 while processing real-time call events in the Call Offered state. As previously described above with reference to FIG. 4, there are several events that the Call Director 110 acts on for a call in the Call Offered state: Call offer message received (FIG. 7a); unexpected delay in subscriber response to a call offer (timeout)

Figure 7A:
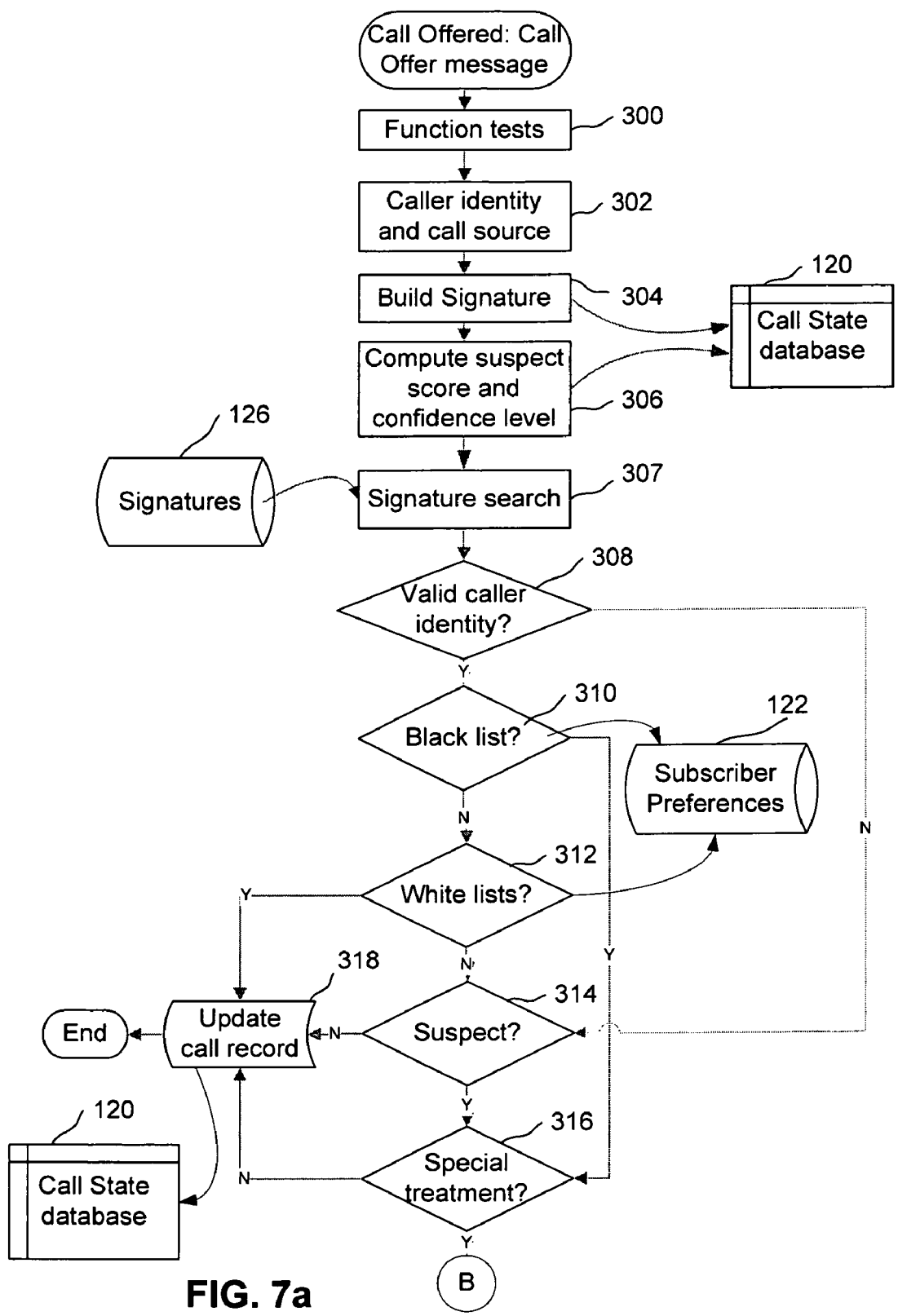
Figure 7E:
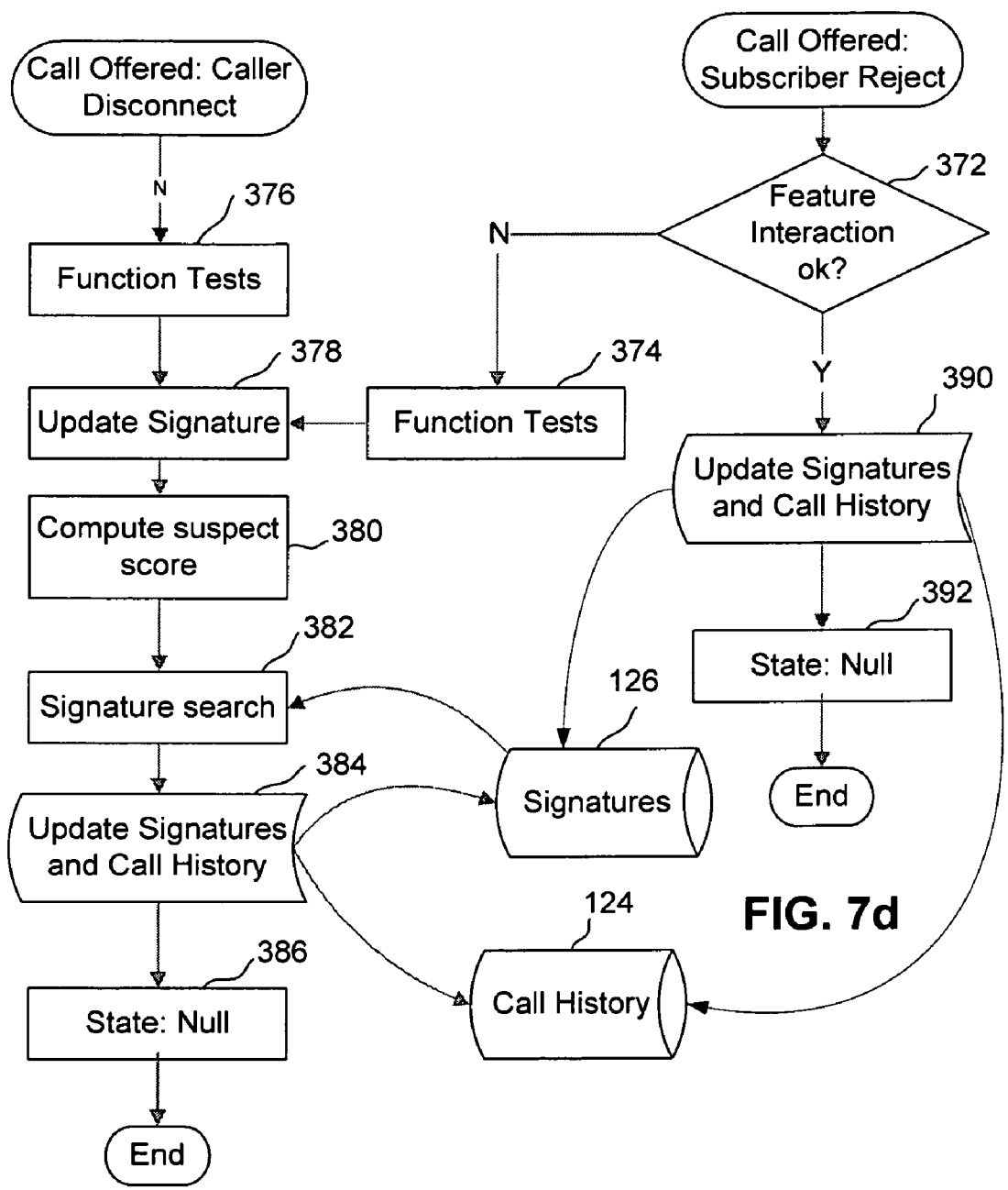

(FIG. 7b); call accepted by the subscriber (FIG. 7c); call rejected by the subscriber (FIG. 7d); and disconnect by the caller (FIG. 7e).

Call Offer Message Received: Of the events permitted in the Call Offered state, the only call control message from a call event that is processed is a Call Offer message. Any other call control message is discarded. The Call Offer event is where an incoming call that has not yet come to the subscriber's attention must be analyzed and action taken to either let the call through or to provide other call treatment.

When the Call Offer message is received, the Call Director 110 determines the call signaling protocol in which the message is coded, extracts key fields and parses the entire message into its components fields and parameters, both those common to all protocols and those specific to the current protocol.

As shown in FIG. 7a, function tests associated with the Call Offered event are then performed (300). These function tests are predefined or added by the service provider or the subscriber. The results of those function tests are stored in the Call State database 120. Two of the function tests determine the caller identity and call source (302). The caller identity and call source are used to perform the first stage of call screening.

The caller identity is in its most precise formulation a unique identifier of the caller in the naming or addressing format used in the call control protocol. The caller identity can be: a telephone number, whether E.164 or other format; URI; user name; validated digital certificate from a trusted certificate authority; or other identifier. Determination of the caller identity is not possible in every case, due to: masking by the caller; limitations of interfaces between networks or interfaces between signaling components within a network; limitations in the call control protocol being used; or for other reasons. A valid caller identity is required to maximize confidence in the function test results and bad actor identification, as will be further described below. When a caller identity cannot be determined with confidence, the call source is determined. The call source is one of, or a combination of: originating network; transit network; IP address; IP subnet; most significant digits of a numbering plan; or other such indication as can be derived from the available data. A call source is never a caller identity, and for the same caller the call source may be different for every call.

The caller identity is historically (see Telcordia GR-30) the primary information that an unwanted caller manipulates, because the caller identity is the one item of data that is transmitted to the UA 102 and used for call screening by an electronic device or the subscriber. Such manipulation of the caller identity includes: marking the caller identity as private; routing the call via a network that removes the calling number; providing a calling number that differs from the caller's true number, (also known as caller ID spoofing), which may be invalid or valid but is associated with another user; a valid number, but one that resolves to a name that is misleading; a calling number that is valid, but when the subscriber dials that number they are subjected to an unwanted commercial message or toll charge; or, a number of a person or business known to the user for the purpose of committing fraud or harassment. For these reasons it is important that the caller identity be extracted from the call offer message and tested.

If the caller identity is a number, whether E.164 or other format, the caller identity should be validly formatted. For example, in E.164 where the country code is 1, for North America, there should be 10 digits. The first 3 digits should be a valid and allocated area code, the next 3 digits should be a valid office code, and together these first 6 digits should be that of an in-use code assigned to a service provider. This test can be performed by checking these digits in the Local Exchange Routing Guide (LERG). Further, the full 10 digits can also be tested to determine if the number is assigned and, if assigned, which network hosts the number by looking up the number in a Local Number Portability (LNP) database. The network identifier can then be used to check for consistency with the charge number and other data in the message. For numbers in other country codes, similar tests are feasible, such as checking the validity of the number of digits, the carrier prefix, and the area code for format and validity.

If the caller identity is a URI, whether in SIP or other protocol, the caller identity may be verifiable in a presence database in the specified domain, and if registered, the IP address of the caller matches exactly or the subnet or the originating network's proxy of the media address specified in the Session Description Protocol (SDP) or equivalent section of the Call Offer message in the call control protocol in use. Further, the proxy in the original Via field in the SIP message header can be compared with the registration domain in the same presence database of the URI domain. Where a caller identity is asserted, such as in a P-Asserted-Identity field, this can be further checked for consistency with the caller's URI, and if a security certificate is utilized it should be verifiable as belonging to the caller or the caller's service provider, as appropriate. Other such tests are feasible where the databases are available and can be referred to within the time constraints of a real-time communications service, and as are particular to current and future variants of the SIP or other protocols that utilizes the URI as a caller identity.

If the caller identity is an instant messenger user name, and the protocol is not SIP, the presence database for the service can be interrogated to determine if the caller is signed on and if the IP address of the caller matches exactly, or the subnet of the media address specified in the call offer message of the instant messenger protocol is in use.

If there is a digital certificate included in the call offer message that authenticates the caller's identity and if the certificate is known to have been validated by the service provider, the confidence in the caller identity is increased except if the certifier is known to be "rogue". The caller identity in this case is the caller identity determined per the above procedures, or if the caller identity is provided by means of the certificate, that caller identity is used. If there is a conflict in caller identity determinations, confidence in the result is lowered per a method determined in the function test. If the certificate was not elsewhere validated, the Call Director 110 may do so if this can be accomplished in a time compatible with the performance objectives of the real-time communication service.

Where a caller identity is marked as private or anonymous, this does not prevent the completion of the above procedures, and such action does not affect whether the caller identity is or is not transmitted or presented to the subscriber. It is possible to construct a function test for caller identities marked private or anonymous since such an indication may indicate that the caller is suspect, especially when considered in combination with other function tests. Furthermore, a private or anonymous caller identity may not be made available to the subscriber if they review the call history. This is governed by service provider policy and/or by regulation.

If the caller identity is determined to be unavailable or suspect, other number data present in the Call Offer message may provide some identity associated with the source of the call. For example, if there is a charge number or original called number or similar number that may be associated with the caller, and can be verified per the same procedure as described earlier for the calling number, the most significant digits of the number may be extracted and used to provide a general indication of a location of the caller. The location may be geographic where the number is associated with a place, or a network or network interface.

If it is not hidden by a proxy or gateway, the IP address of the caller's IP appliance can provide a call source that is precise, though it may be different in different calls from the same caller. The IP address of the media connection should be used in preference to the signaling connection, such as is provided in a Session Description Protocol (SDP), because it is less likely to be supplanted by proxy addresses. Since IP addresses of the caller may not be static and can be changed by a caller-side NAT device, a subnet address range can be used with less specificity if the address mask only excludes the least significant portion of the address, for example 255.255.255.0 in IPv4.

In the case of a URI, if it is verified per the earlier described procedure the domain name provides a non-geographic virtual identity of the call's source.

As can be seen from the description of the variety of forms a call source can take, the approximate order of decreasing specificity is IP address, number, proxy or NAT IP address, URI. This information can be incorporated within a particular instance of the call source function test, to select the call source or combination of sources, and to determine the result of the function test.

After the caller identity and call source have been determined with the highest available precision, a signature of the message is built (304) from a combination of results from function tests and fingerprint attributes, as will be described in more detail below. The signature is stored in the record for the present call in the Call State database 120.

The results of the function tests are weighted, normalized and combined to calculate a suspect score for the call (306), as will also be further described below. The results of the function tests are further evaluated to calculate a confidence level associated with the suspect score calculation (306), as will also be further described below. The suspect score and confidence level will be used by the Call Director 110 to determine the treatment for the call. The suspect score and confidence level are both stored in the record for the current call in the Call State database 120. It should be understood that the function tests, signature, suspect score and confidence level are specific to the current call and call offer message, and at this point in the processing are not related to any other calls or Subscriber Preferences.

Using the function test results and signature previously stored, the Signatures database 126 is searched (307) for relevant results, as will be described below in more detail.

If the results of the caller identity function test, optionally combined with the call source function test, is above a threshold (308) specified by the service provider or the subscriber, where any subscriber-specified thresholds takes precedence over a default set by the service provider, the Subscriber Preferences database 122 is searched to determine whether the caller identity is on one of the subscriber's lists, which include: a subscriber's black list of caller identities from whom the subscriber does not wish to receive calls; a permanent white list of caller identities from whom the subscriber does wish to receive calls: and, a dynamic white list of caller identities maintained by the Call Director 110.

If the caller identity is on the subscriber's black list (310), a treatment for the call is determined (316), as will be described below with reference to FIG. 7b, and by doing so the call is prevented from reaching the subscriber except in certain cases which will be described below.

If the caller identity is in either the permanent or dynamic white lists (312), further call screening is not performed. In this case the call record is updated (318) and the CA 104 is directed to continue the call, which will result in the call offer being transmitted to the subscriber's UA 102 in the usual manner. This result is recorded in the Call State database 120, and a call timer is started.

Otherwise, the Call Director 110 determines whether the call is suspect (314) using function tests that are unique to the subscriber or specified by as defaults provided by the service provider. Those function tests can be as simple or complex as desired, limited only by the types of data available to make the determination.

The following data that is available for testing to construct a suspect call function test: the function tests that have been performed (300) (any of the function tests can be used in the suspect call test independent of the calculated suspect score and confidence level); the calculated suspect score and confidence level (306) (the suspect test can utilize any threshold comparison for this data); matching signatures and their relevance from the signature search (307) (the suspect call test can utilize other than the closest matching signature, signatures that have a small number of associated calls, signatures with only a large number of calls and an unwanted disposition, or signatures where the only calls in the call history are those associated with the user); time of day, day of week, or other external conditions which are not available from the function test results (this permits, for example, a subscriber to establish quiet times during which all calls except those in the white list are given special treatment).

Regardless of the suspect call test constructed and used, none of the above data is modified or otherwise affected by those function tests or a subsequent screening decision solely as a consequence of the suspect call function test.

If it was determined at (314) that the call is not suspect, the call record is updated (318) and the Call Agent 104 is instructed to pass the call to the UA 102 for completion, as described above. However, if the call is determined to be suspect, the Call Director 110 determines a treatment for the call (316).

As described above, there are cases where, after testing the black list, signature match and suspect test the call is subject to special treatment. Special treatment is applied when call screening determines that the call is unwanted. The various types of special treatment are generally known in the art. They can be integrated to meet the subscriber's objectives and preferences in how unwanted calls are handled, and to use the special treatment to further analyze the suspect nature of the call by examining the caller's behavior in response to the special treatment provided.

The type of special treatment to be provided is selected by referring to the subscriber's preferences in the Subscriber Preferences database 122, and if not specified, the special treatment is selected per service provider defaults. The special treatment selected can be based on: the suspect call test (314) result; the suspect score and confidence level (306); or the signature matching (307). As an example, if the confidence level is low, such as less than 0.3, the time is between 4 P.M. and 8 P.M., and the category of a matched signature is 'Charity', the subscriber may wish to give the caller a further opportunity by inviting them to enter a security code or to speak their identity as verification that the call is wanted by the subscriber. It should be understood that the Subscriber Preferences can take other forms based on the analysis results, and including the individual function tests, and that other forms of treatment not explicitly addressed in this detailed description may be provided.

If it is determined at (316) to allow the call to continue with an indication to the subscriber that the call is suspicious, the CA 104 is instructed to continue the call with the addition of such indication to the UA device 102. The form in which the indication is made is particular to the protocol used for call signaling and the UA device 102. As examples: a text message or iconic indication may be provided for display by the UA device 102; distinctive ringing may be applied; a lamp or other visual cue may be indicated; or any other form of indication known in the art. Once the Call Director 110 has instructed the CA 104 to continue the call in this manner, the call record in the Call State database 120 is updated with the results of the analysis and action taken (350, see FIG. 7*b*), the call remains in the Call Offered state, until it is accepted or ended, as described above.

If it is determined at (316) that special treatment is required, processing continues as shown in FIG. 7*b*. Based on the results of the function tests described above, the Call Director 110 makes a decision as to what special treatment is required. The decision may be, for example: take a message (326); request caller's identity (330); request a security code (334); or play and announcement (338). If the Call Director of 110 decides to take a message, the caller is invited to leave a message (328), typically in the same media designated in the call offer message. The CA 104 is instructed to deflect the call to the Message Server 108 where a default or subscriber-specified invitation in the form of the media is automatically played to the caller, inviting the caller to leave a message. Once the Call Director 110 provides the instruction to the CA 104, the call state is transitioned to Message Pending (344), a Message Pending timer is started, and the Call History database 120 is updated (345) with the action taken. The subsequent possible events and actions taken thereafter are described below with reference to FIGS. 9*a* and 9*b*.

If the special treatment is to invite the caller to speak their identity (332), typically in the same media designated in the call offer message, or to input a security code (336), sometimes also known as a privacy code, the CA 104 is instructed to deflect the call to the Message Server 108 or other device in the network to provide this treatment. This may entail playing a default or subscriber-specified invitation to impart a predetermined identity (332) or security code (336), whether in media, by DTMF digit entry, etc. Once the Call Director 110 instructs the CA 104, the call state is transitioned to Message Pending (344), the message pending timer is started, and the call history record in the Call History database 120 is updated (345) with the action taken. The subsequent events and actions taken thereafter are described below with reference to FIGS. 9*a* and 9*b*.

If the special treatment is to play an announcement (338), the CA 104 deflects the call to the Message Server 108 or other device in the network to play a default or subscriber-specified announcement (340) typically in the media designated in the call offer message, and then disconnects the call. Once the Call Director 110 instructs the CA 104 the call is transitioned (346) to the Null state by deleting the call record in the Call State database 120, and the Call History database 124 and Signature database 126 are updated (348), as will be described below.

If the special treatment is to reject the call (342), the CA 104 is instructed to disconnect the call with a cause indication that the subscriber has rejected the call. Once the Call Director 110 instructs the CA 104, the call state is transitioned to Null (346) by deleting the call record in the Call State database 120 and the Call History database 124 and Signature database 126 are updated (348).

There may be instances in which the protocol used between the Call Director 110 and the CA 104, or in which lack of functionality in the CA 104, MS 108 or other network component, does not permit the use of certain types of special treatment. In those instances unsupported types of special treatment are unavailable for selection in the Subscriber Preferences database 122 or service provider defaults. Alternatively, the Call Director 110 can be programmed to determine the types of special treatment that are available in a particular case. If the CA 104 cannot interpret special treatment instructions received from the Call Director 110, the CA 104 may discard the instruction, in which case the Call Director 110 times out and takes action as described when a timeout occurs, for example.

As described above, the Call History database 124 and Signatures database 126 are updated (348) when the call is transitioned to Null state. The call record from the Call State database 120 is written to the Call History database 124. If there is a matching signature for the current call in the Signatures database 126, and the highest-ranked matching signature is ranked above a predetermined matching relevance threshold, the highest-ranked matching signature in the Signatures database 126 is updated. In order to update the Signatures database 126 it must first be determined whether the signature is new. The signature is new if there are no matching signature records for the call record in the Call State database 120. This is the case if no matching signatures of sufficient relevance were found when the Signature database 126 was searched (307). If the signature is new, the signature is added to the Signature database 126, along with a reference to the current call record in the Call History database 124, regardless of whether the call was wanted or unwanted if there was at least one of: a minimum threat level assigned to the call; the most positive function test result was above a predefined threshold; or, a suspect call function test was used to select the treatment exceeded a predefined threshold.

Call Offered: Timeout—If the Call Offer timer expires the time for completing an offered call has elapsed and the call enters the Call Offered: Timeout event, shown in FIG. 7*c*. This occurs when either a call accepted message from the subscriber has been lost or alerting has continued for an excessive period of time. Timed out calls must be detected to ensure that they are not orphaned. The Call Offer timer may be set by the service provider to any suitable interval to prevent orphaned calls, while allowing sufficient time for the subscriber to reasonably respond. Additionally, should the subscriber manually or automatically deflect the call to another termination, further screening of the call cannot necessarily be accomplished, in which case the call is treated as if a timeout had occurred. When a timeout occurs the Call History database 124 and the Signatures database 126 are updated (350), as described above. Then the call state is transitioned to Null (352) by deleting the call from the Call State database 120.

Call Accepted—When an offered call is accepted by the subscriber the call enters the Call Offered: Call Accepted event shown in FIG. 7*d*. When the call is accepted by the subscriber, a message is sent by the UA 102 to the CA 104. The CA 104 forwards the message to the Call Director 110. On receipt of the call acceptance message, Call Director 110 starts a call duration timer (352) and transitions the call to the Call Active state (354). This permits the Call Director 110 to monitor the behavior of the subscriber and caller for later analysis, as will be described below with reference to FIGS. 8*a*, 8*b* and 8*c*.

Subscriber Rejection of the Call—This occurs when the subscriber explicitly or implicitly rejects an incoming call, as shown in FIG. 7e, Call Offered: Subscriber Reject. This event is communicated to the Call Director 110 by the CA 104 by forwarding an indicative message from the UA 102. Call rejection occurs when: the subscriber rejects the call by pressing a call reject key or similar input to the UA 102; the subscriber ignores or otherwise does not accept the call, including being unaware that the call is being offered. Subscriber rejected calls also include calls which the UA 102, utilizing an internal feature set that may be unknown to the service provider or the Call Director 110, deflects the offered call either immediately or after a predetermined time to a message service or other location, the identity of which may not be discernible to the Call Director 110. None of the above behavior can be assumed to be suspect, but further testing is performed to evaluate and update the suspect score and confidence level previously determined.

Aside from the above-mentioned UA-based features, there may be features provided by the service provider that illicit the same call rejection behavior. In this case these features are known by the Call Director 110 either by an indication in the Subscriber Preferences database 122 or other interface provided by the service provider to make this data available to the Call Director 110. Certain feature interactions can be tested to confirm whether the call rejection was due to such features. For example, the subscriber may have activated a Do Not Disturb feature that rejects every call or deflects calls to a message service. If this feature activation is detected (372), no further action is required by the Call Director 110. Therefore the Signatures database 126 and the Call History database 124 are updated (390) as described above, and the call enters (392) the Null state when the call record is deleted from the Call State database 120.

If the feature interaction test (372) does not confirm a feature interaction, further analysis is performed. Function tests (374) specific to subscriber rejected calls are evaluated and added to the set of evaluations associated with the call.

Such function tests can include a test to measure an interval between a time the call was offered and the rejection or deflection event, to judge whether the action was automated or by explicit subscriber action. A very brief interval indicates action by the UA 102, whereas an interval of several seconds may indicate subscriber consideration preceding the call rejection, and a long interval may again indicate UA action due to no input from the subscriber. There may also be an explicit indication of which of the above actions occurred in the message sent by the UA 102, and a function test is provided to analyze any message received from the UA 102.

In another example, cumulative rejects can be analyzed in a function test (374) by referral to previous similar events associated with the current signature or bad actor retrieved from the Signatures database 126 and the call history records to which the signature refers. If two or more subscriber rejects are separated in time by a specified duration, a result between 0 and 1 is returned in proportion to the number of such calls that are located. As a further test, if one or more of these calls is preceded by a rapid subscriber disconnect, a similarly proportioned result of between 0.5 and 1 is returned.

Caller Disconnect (Abandon)—When Call Offered: Call Disconnected event occurs, as also shown in FIG. 7e, the caller has disconnected before the subscriber could either accept or reject the call. There are normal situations where caller disconnect can occur, such as: wireless telephone connection interruption; or, caller reconsideration of the call due to mis-dial, interruption or other change of intent, which does not necessarily indicate suspect behavior. There are, however, types of unwanted callers that deliberately exhibit disconnect. Those include but are not limited to: Wangiri attacks; call center systems that abandon a call if there is no available agent, or that terminate the call offer early to avoid deflection to a message system or answering machine; and prank callers. In addition, some telemarketers will try to reach the subscriber many times in succession over a period of time, hoping to catch the subscriber as they come home or to annoy the subscriber into finally accepting a call in order to stop the continued offering of those the unwanted calls.

Function tests (376) designed to identify caller disconnect behavior are performed. Examples of the function tests performed at (376), include: time of day and day of week weighting to time periods when telemarketing or harassment is most likely (these weightings can be assigned by the operator, and optionally by the subscriber to meet specific needs); cumulative weighting of previous calls from the same signature, bad actor or caller source, if there were no similar calls in lightly weighted time periods (this function test requires inspection of the signatures located by the signature search, and any call history records that these signatures reference); conditional score with other suspect activity, especially if a personal unwanted caller, or the subscriber has previously performed a rapid subscriber disconnect, or the caller has previously been deflected to a message service and disconnected without leaving a message or left a suspect message. It should be understood that these function tests and the following actions do not prevent the presently analyzed call from reaching the subscriber, even if no connection ensued. The utility is in determining if such a call is unwanted and constructing a signature that can be used to screen out such calls in future to this same subscriber and to other subscribers.

As described above, after the function tests (376) have been performed, a matching signature is updated (378) with a reference to the call record stored in the Call History database 124. A suspect score is then computed (380) using methods described above with reference to FIG. 7b. Another search of the signatures database is then performed (382) using the updated signature. The Signatures database 126 and the Call History database 124 are updated (384) using the suspect score results and the function test results, and the call enters the Null state (386).

Figure 8A:
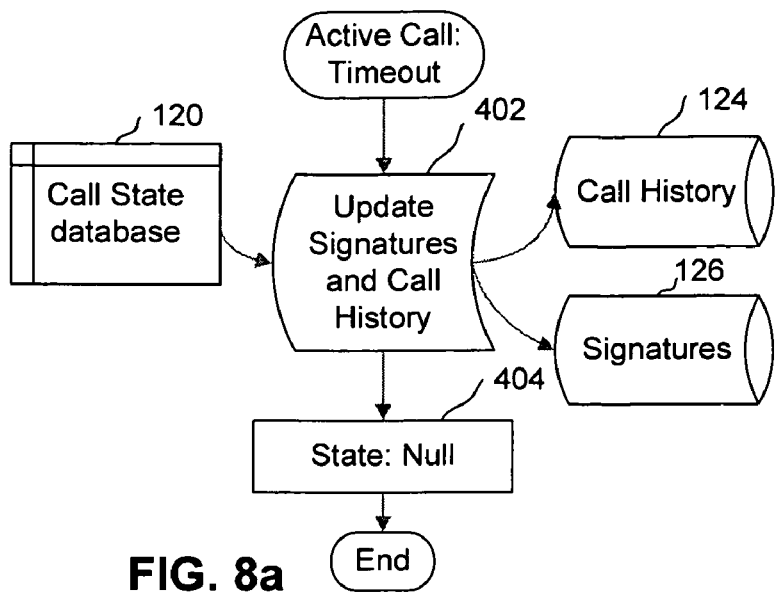
FIGS. 8a, 8b and 8c are a flow charts illustrating principal tasks performed by the program instructions of the Call Director while processing real-time call events in a Call Active state.
Figure 8B:
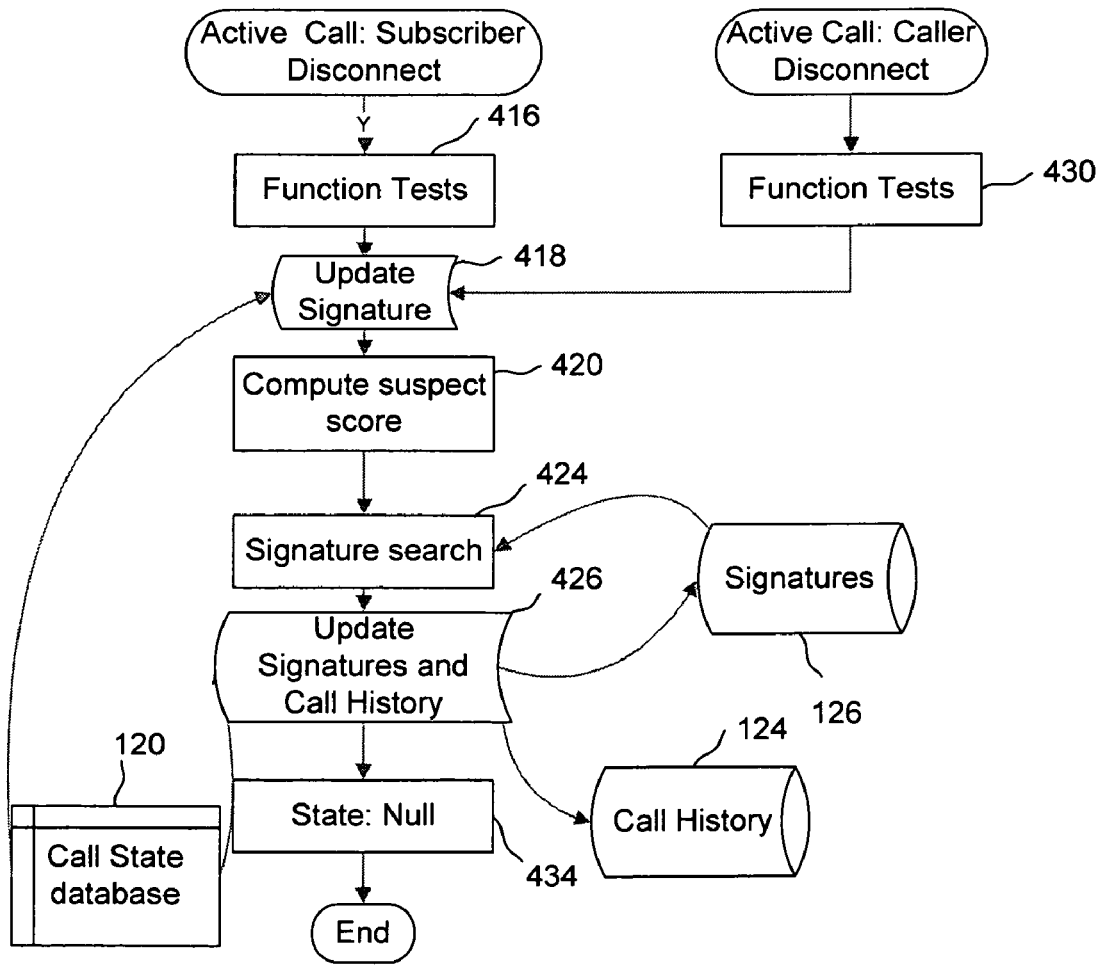
Figure 8C:
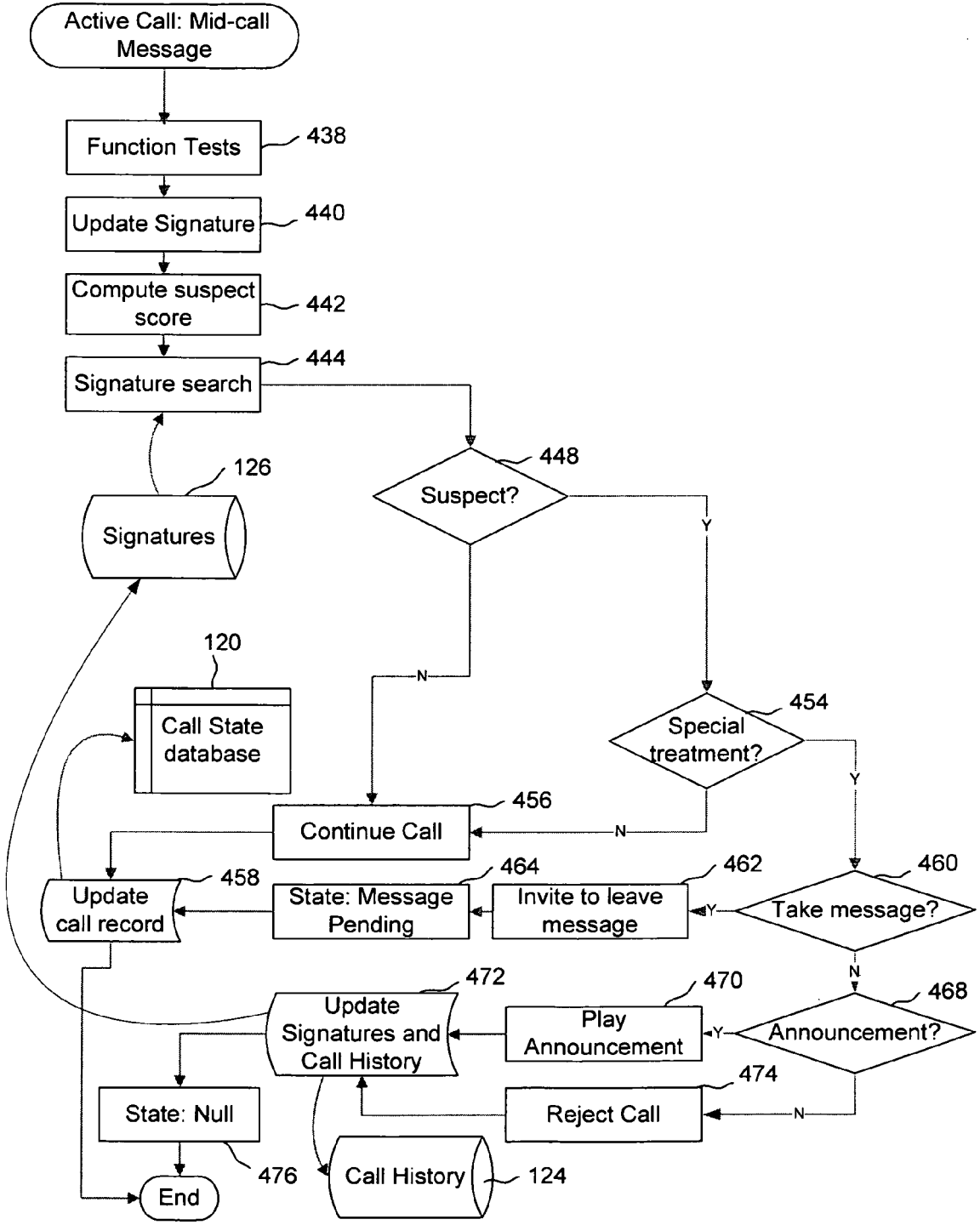

FIGS. 8a, 8b and 8c are flow charts illustrating principal tasks performed by the Call Director 110 while processing real-time call events in the Active Call state. As previously described with reference to FIG. 4, there are several events that the Call Director 110 responds to in the Active Call state: long call duration (Active Call: Timeout); call disconnected by the subscriber (Active Call: Subscriber Disconnect); call disconnected by the caller (Active Call: Caller Disconnect); and, mid-call message received (Active Call: Mid-Call Message).

Active Call: Timeout—When the Active Call timer expires (which was started when the call was accepted) there are several possible reasons. First, one or more messages may have been lost, and the Call Director 110 was not notified that the call had terminated. Second, the call is continuing long enough that it is assumed that no further suspect behavior is probable. A duration of the Active Call timer is selected and refined by the service provider to assure a desired balance between missing some types of suspect behavior and managing processing resources.

In if the Active Call timer expires there is a timeout, and the Call Director 110 updates the Signatures database 126 and the Call History database 124 (402). The call then enters the Null state (404) and processing ends.

Active Call: Subscriber Disconnect—If the Call Director 110 determines that subscriber has disconnected the call enters the Call Active: Subscriber Disconnect event as shown in FIG. 8b. In that case, the behavior of the subscriber is analyzed using function tests (416) and the signature is updated (418). No call treatment is possible because the subscriber has disconnected, however the results of the following analysis are used to screen future calls from the same caller, to this or any other subscriber.

Since the call duration was less than the timeout interval there is a possibility that the call was unwanted, regardless of the earlier calculation of an acceptable suspect score or a signature match. For example a previously unknown telemarketer has begun operation and has offered a call that passes earlier function tests because the telemarketer was either not spoofing caller identity or was performing some other such behavior, or the telemarketer used masking methods that have not yet been tested. In such a case, subscriber feedback, i.e. either explicit or monitored subscriber behavior, is used to detect such unwanted callers.

In one function test (416), a duration of the call is measured. If the duration of the call is less than a threshold value, the call may be considered suspect. Furthermore, the result of the function test can vary from a minimum to a maximum value based on the duration of the call. The effectiveness of this function test can be improved by subscriber education about what to do if suspicious about an incoming call. For example, if the subscriber answers an unwanted call, immediate hang up ensures a score for this function test that is likely to screen out the call on a next attempt by the caller.

As an example, the function may return −1 if the call duration is less than 1 second or more than 15 seconds; from 1 second to 2 seconds the result increases linearly from −1 to 1, then remains steady at 1 from 2 seconds to 6 seconds, declining linearly from 1 to −1 between 6 seconds and 15 seconds. In this function test example, it is assumed that a machine or other human action terminated the call if the call duration was less than 1 second, and therefore the subscriber could not have determined that the call was "unwanted". From 2 seconds to 6 seconds, the subscriber may have listened for silence or other initial speech that could indicate a call center agent search was in progress or that the caller exhibits other subscriber-perceived suspect speech or behavior. As the call duration increases, the subscriber's comfort level with the call is considered to be increasing and therefore the function result decreases until it reaches −1 at 15 seconds.

Other such function tests that are designed in the same manner to track normal user behavior in such circumstances that are particular to one subscriber or a class of subscribers, whether tuned to cultural or other human factors. The function test can be customized for each such subscriber or class of subscribers, or one function test can be used for all subscribers.

One or more subscriber disconnected events can be discounted if the function test result is below a threshold value of number of occurrences and duration, as will be further described below with reference to FIG. 18 which illustrates signature life cycle processing, because other non-suspect causes may also result in a positive function test result. Those causes may include: subscriber accidental disconnect by any means; poor connection quality resulting in the subscriber disconnected; and the like.

Another function test examines a specific call disconnect cause indication that some call control protocols provide. The call disconnect cause indication from the subscriber, whether UA-generated by feature action or subscriber-generated by manual indication to the UA 102, may indicate that the subscriber considers the call unwanted. The call disconnect cause indication may be specifically constructed for the function test, or one that is standard in the call control protocol and can drive such a test even if it does not have a desired granularity. If a standard protocol cause value is used, the function result and confidence level can be adjusted to reflect the degree of certainty.

After the function tests (416) are completed, the call signature is updated (418) and a suspect score is computed (420), as described above. A signature search (424) is conducted. The Signatures database 126 and the Called History database 124 are updated (428), and the call enters the Null state (434). All records associated with the call are then deleted from the Call State database 120.

Active Call state suspect score and signature are updated by appending the results in the Call State database 120 record. Earlier state evaluation results are not replaced or changed by the new results in this Active Call state, except for an overall suspect score and confidence level and how these affect any matched signature.

Active Call: Caller Disconnect—It is determined that the caller has disconnected. Electronic call center equipment used for telemarketing uses predictive dialers and other load balancing equipment to minimize operating cost. That equipment generally automatically dials numbers and transfers the call to a human agent when the called party answers. If an agent is not available within a few seconds the call is disconnected. The equipment may call the subscriber again, one or more times, after such an event. Furthermore, the call center software may detect a subscriber's answering machine by detecting a long greeting rather than a simple "hello", and so perform a rapid disconnect.

There are also telemarketing services that perform rapid caller disconnects because their only purpose is to collect data about when a called party is available. They sell this data to other telemarketers. In this case, each called party may encounter only one rapid caller disconnect from the source of these calls.

The function tests performed at caller disconnect (430) may be most useful for identifying signatures and bad actors, because each subscriber may encounter only one or two rapid caller disconnects from the source of these calls within a short enough time interval to be deemed suspicious. When collected for many users this suspicious behavior can be effectively analyzed to identify signatures of bad actors. Therefore a function test for rapid caller disconnects can be used to provide a reason code for a new or matching signature, and will cumulatively over time result in an increasing threat level of a signature or bad actor, as will be further described below. A suitable function test for caller disconnect is constructed similarly to the call duration timer test used for subscriber disconnects in the Active Call state, as described above. The function tests (430) for caller disconnects can be more refined because the caller disconnection event is generally machine-driven and therefore more predictable. For example, a call duration of between 1-4 seconds returns a function result of 1, and the result linearly declines to −1 at 8 seconds of call duration. Non-suspect callers may also disconnect early for the same reasons as described above for early subscriber disconnects. Therefore the same types of mechanisms described above are used to avoid false positives.

Active Call: Mid-call Message Received—This call event occurs if a mid-call message is received, and processing continues as shown in FIG. 8c. Due to feature operation and other call status signaling events, there may be signaling messages sent between the parties to a call during the conversation, i.e., during the Active Call state. These are not messages that end the call. These mid-call messages can be analyzed in certain cases to refine the suspect score of a caller, to improve the validity of the caller's signature. It may also be desirable to interrupt the call if a mid-call message is sufficiently suspect.

Most mid-call messages are of low threat because they generally cannot cause a reconfiguration of the call or otherwise impact the subscriber. Consequently, such mid-call messages can be passed by function tests that rate these messages with a score of −1. Certain other mid-call messages must be further analyzed for suspect behavior. Examples those mid-call messages include: SIP Info messages, which might instruct the subscriber's UA 102 to display an advertising message or download or execute a remote file; or, a SIP re-Invite message, which might redirect the current connection from the original caller to another, suspect destination.

An example of a function test for a SIP Info message is to subject the payload of the message to the same type of anti-spam filters used for e-mail, where the payload is text or has an attached file that can be analyzed by such anti-spam filters. In this way a known commercial contact or someone pretending to know the subscriber, and with whom the subscriber is in conversation, could become suspicious by sending such a signaling message during the conversation. The analysis and possible treatment proceeds in real-time.

A function test for a SIP re-Invite message determines whether the re-Invite message arrived less than a set number of seconds after the subscriber accepted the call. The re-Invite message is deemed suspect if it arrived later than expected. This could be an attempt to cause the subscriber to be connected to an unwanted caller even if the original screening failed to discover the suspect nature of the original caller.

Mid-call message screening may also be performed when the subscriber initiated the call, possibly because of misleading advertising in the media or a persuasive message left by the caller in an earlier call. Such calls may also be subject to these screening tests by having the Call Director track and monitor these subscriber-initiated calls, which is a simple extension of the earlier described operation for calls to the subscriber. In its basic formulation, as earlier described, the Call Director 110 does not monitor subscriber-initiated calls other than for the call offer message.

After the function tests (438) are performed, the call signature is updated (440). A suspect score is computed (442) and a signature search (444) of the Signatures database 126 is performed. If the suspect score or a matching signature exceeds a predetermined threshold (448), the Call Director 110 decides a treatment for the call (454).

If special treatment (454) is required, it is determined whether a message should be taken (460). If a message is to be taken, the caller is invited to leave a message (462) and the call enters the call state Message Pending (464). The call record is updated (458) by updating records in the Call State database 120, and processing ends. If a message is not to be taken, it is determined whether an announcement should be played (468). If so, a predetermined announcement is selected and played (470), the signature is updated in the Signatures database 126 and the call history is updated (472) by a writing call records to the Call History database 124 and deleting all records associated with the call from the Call State database 120, and the call enters the Null state (476). Call processing for this call then ends.

If an announcement is not to be played, the call is terminated (474) by instruction sent by the Call Director 110 to the Call Agent 104, the Signatures database 126 and the Call History database 124 are updated (472) as described above, the call enters the Null state (476), and call processing for this call ends.

Figures 9A, 9B:
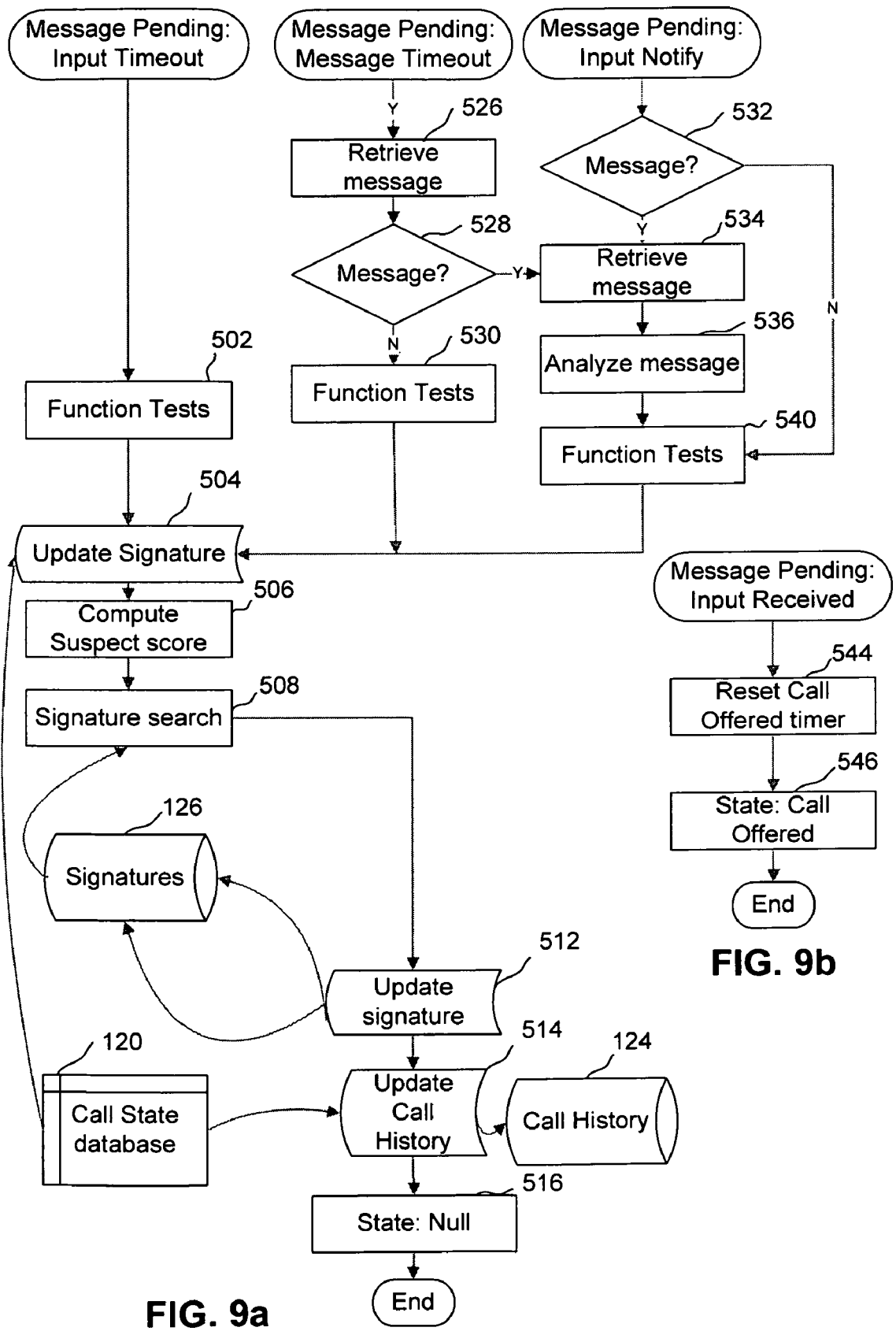
FIGS. 9a and 9b are flow charts of principal tasks performed by the program instructions of the Call Director while processing real-time call events in a Message Pending state.

FIGS. 9a and 9b are flow charts illustrating principal steps performed by the Call Director 110 while processing real-time call events in the Message Pending state. As described above in the state transition drawing (FIG. 4), there are several events that the Call Director expects may occur when a call is in the Message Pending state: Caller input not received (Message Pending: Input Timeout); wait time exceeded for a message to be recorded by the caller (Message Pending: Message Timeout); notification of caller input (Message Pending: Input Notify); and, notification of message completion (Message Pending: Input Received).

It should also be understood that Message Timeout and Message Notify may occur when UA 102 or CA 104 feature behavior deflect a call to the MS 108 when the subscriber is busy, does not answer, or for other reason. This is a normal operation of other MS 108 features that may be made available by the service provider. If desired, any message left for the subscriber at the MS 108 can be analyzed in the same way as if there had been special treatment due to screening performed by the Call Director 110.

Message Pending: Input Timeout—Input timeout occurs when, due to special treatments described above, the caller has failed to provide the required screening input, such as a security code or a caller identification within a predetermined time allowed. Alternatively, input may have been provided but that input was not correct or was incomplete, as determined by the MS 108 or other device per predefined rules established by the service provider or the subscriber. Such incorrect or incomplete input, if it is made available to the Call Director 110 as part of notification of this event, can be analyzed with function tests (502) designed for that purpose.

An example of such a function test (502) is to determine: whether the caller disconnected without providing any input; if the caller stayed connected but did not respond to the invitation to provide input; or, if an entered security code did not match any of those sanctioned by the subscriber. A more refined function test determines whether the entered security code differed in only one digit, which may indicate an entry error rather than an unwanted caller. Other function tests may also be performed, as will be apparent to those skilled in the art.

The signature for the call is updated (504), a suspect score is computed (506) and a signature search (508) is conducted. The Signatures database 126 is updated (512), the Call History database 124 is updated (514), and the call enters the Null state (516).

Message Pending: Message Timeout—If the treatment for an incoming call was to invite the caller to leave a message for the subscriber, or if the subscriber deflected the caller to the MS 108 for other feature operation, and the subscriber specified in the Subscriber Preferences database 122 that messages left in such a case are also to be analyzed by the Call Director 110, and the Message Pending timer for the call expires, it is necessary to determine if a message has been left and if so, to retrieve the message for analysis.

Message timeout (524) can occur if: the MS 108 does not possess the ability to notify the Call Director 110 of a received message; the caller takes more time to leave a message than the timer permits; or, the caller does not leave a message but fails to disconnect. To avoid any but the first instance, the Message Pending timer is normally set to a time longer than the maximum message time permitted by the MS 108. The MS 108 typically gives the caller some indication that the timer is about to expire.

If message timeout occurs for a call in the Message Pending state, the Call Director 110 sends (526) a request message to the MS 108 to inquire if there is a message (528) for the call. The call is identified by a call identifier as described above. If there is no message because message recording is in progress, the Call Director 110 can restart the Message Pending timer and wait for a further event, specifically timeout of the same timer or notification that a message has been received.

When the inquiry (526) regarding the message results in a positive response (528) from the MS 108, the Call Director 110 requests that the MS 108 transfer the message in its entirety in the media format in which it was left (534). If there is no message the MS 108 responds with such an indication to the Call Director 110. If a message is successfully transferred from the MS 108 to the Call Director 110, the message is analyzed (536) as will be described below with reference to the Message Notify event.

If it is determined at (528) that there is no message, function tests (530) can determine the suspect nature of this event. For example, a function test may return a result of 1 to indicate that the caller is suspect to the maximum value permissible. This is often appropriate since many unwanted callers such as telemarketers, prank callers, and those intent on harassment avoid leaving messages. Other function tests may include analysis of other collected test results, signatures and call signaling messages from earlier events in the call to further refine how suspect the lack of a message is in the current call. After the function tests (530) are performed, call processing continues through (504)-(516) as described above.

Message Pending: Message Notify—If the MS 108 is able to send a notification to the Call Director 110 when a message has been left by a caller, or when the caller has not left a message, because of excessive delay in receiving media content from the caller, or the caller has disconnected, a Message Notify is sent to the Call Director 110. The Message Notify message includes the call ID for the call, which was provided to the MS 108 when the call was deflected to it for special treatment or other feature action. If there no message was left by the caller (532), per indication of such in the notification message from the MS 108, the event is analyzed by performing function tests (540) and the other actions described above with reference to (504)-(516).

If there is a message (532), the message is retrieved (534) and the media stream that contains the message is analyzed (536) to identify whether it contains any characteristics of an unwanted caller. The analysis does not require speech recognition, in the case of voice, or the recognition of drawings or action, in the case of still pictures or video, but does not preclude inclusion of those where feasible or appropriate.

In the case of audio media such as voice-band speech, for example G.711 or G.723 codecs, the following analysis can be performed, and such analysis can be used in subsequent function tests (540): the amount of leading silence or low-amplitude noise before normal volume sound begins (this is a common characteristic of call centers which wait for an available agent after the call is accepted); pure tones with harmonic structure, tone length and inter-tone gaps that is indicative of music, not speech; music, which is atypical in messages from most callers, can indicate a commercial message that is unwanted. When leading silence is excised, the first normal volume sound is sampled, up to a set number of seconds, and compared to such samples in signatures to find a match. This test may require an exact digital match, or only a strong correlation in amplitude and spectral density, after compensating for slightly different start times and transcoding where the message and signature samples are encoded with different codecs. This test can be further strengthened if combined with message length in either time or media stream size, after excision of leading and trailing silence and low-amplitude noise.

The function tests (540) may also search for consistency of amplitude and sound cadence that is characteristic of a rehearsed, pre-recorded announcement rather than the low consistency typical of messages left in real time by human callers.

After excision of leading and trailing silence or low-amplitude noise, the function test may examine the message length to determine if it is less than a specified duration. This is common when a call center system recognizes a call was answered but does not or cannot determine if it is receiving a greeting from the MS 108. When the call center agent is connected there may be a brief human-spoken inquiry to determine if the subscriber is on the line, and then disconnect when there is no response.

The function test may examine the message for an intermittent tone that matches the timing and spectrum of a fax machine ready tone.

If the media is not audio, other forms of analysis are possible. In the case of video, there is typically an audio channel that can be analyzed using the methods described above, irrespective of the video media content. Both still pictures and video can be analyzed for excessive amounts of skin tone colors that may be indicative of pornographic images, with function results correlated to the percentage of the total image or frame with this tone, area shape with this color, and closeness of match of the color using, for example, relative levels of RGB (red, green, blue). When suspect picture or video content analysis is combined with audio channel content analysis as described above, greater confidence in the function test result can be achieved.

After message analysis, processing continues with (504)-(516), as described above.

Message Pending: Input Received—As shown in FIG. 9b, when input from the caller is successfully collected, the Call Director 110 is notified to continue processing the call. This is normally a wanted caller so there is no analysis required. The successful collection of input is recorded in the call record in the Call State database 120 (not shown).

The Call Offered timer is restarted (544) since the subscriber is typically informed of an incoming call at this point through separate communication between the MS 108 and CA 104. The call state is transitioned to Call Offered (546) by updating the call record in the Call State database 120.

From this point in the call offer process, subscriber and caller behavior are further analyzed per the procedures already described for the Call Offered state. For example, the subscriber may reject, ignore or deflect the incoming call based on review of the caller input. Therefore it is understood that successful input is not sufficient in itself to determine that the caller is wanted. However, it is one further function test in the total set of evaluations to be performed.

Figure 10:
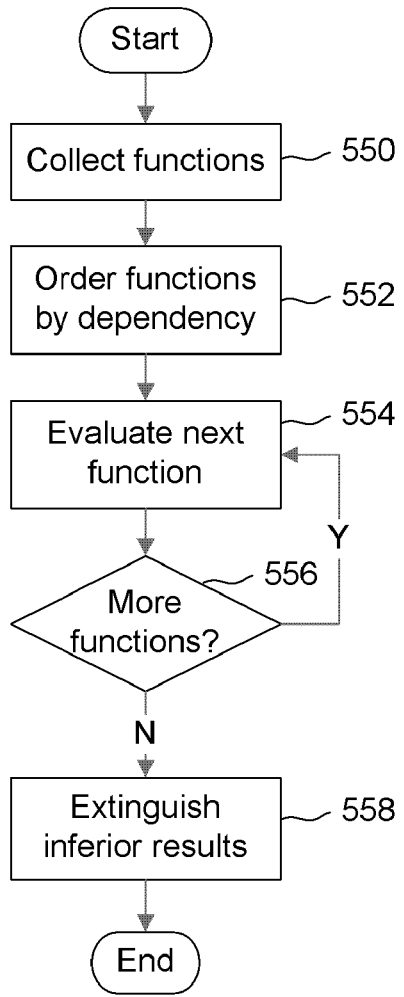
FIG. 10 is a flow chart illustrating an algorithm for performing Function tests in accordance with the invention.

FIG. 10 is a flow chart illustrating an algorithm for performing Function tests in accordance with the invention. As described above, at points in each call state there is an opportunity to use the available data to further determine whether a call is wanted or unwanted. Consequently, a set of function tests is constructed for each call state and event. FIG. 10 illustrates a common function test procedure that is performed by the Call Director 110. Specific function tests have been described above with reference to FIGS. 1-9. The function tests described do not constitute a complete set of function tests, or a complete set of potential function tests. Only those that are particularly germane to the present invention or that serve as illustrative examples have been described. Function tests can be defined, implemented and integrated into the Call Director 110. This permits extension of the invention to new call control protocols and call control protocol variants, provides new or improved function tests to adapt to the changing behavior of unwanted callers and new classes of threats. The general structure of performing function tests and calculating suspect scores permits continuous improvement and expansion of call screening in accordance with the invention.

Function tests in general fall into one or more general categories. In each of these categories, examples are described that cover a broad scope of the possible function tests within the category, but are not intended to be inclusive of all possible test functions.

Example 1

Presence or non-presence of a call control protocol message field or parameter. If a mandatory field or parameter is missing from a call control message, or one that is optional but rarely present or not present is included in a call control message, the call control message can be considered suspicious. For example, if a Calling Number parameter is not present in an SS7 ISUP Initial Address Message, or if a Maximum Forwards field is not present in the header of a SIP Invite message, or if a User Information parameter is present in an SS7 message.

Example 2

Unusual or invalid content of a call control protocol message field or parameter. Examples can include: a Maximum Forwards field in a SIP Invite message containing 0 or a number over 100; an E.164 number field where the number is incorrectly formatted or is known to be vacant or unused; or, an SDP in a SIP Invite message that specifies a single codec of a particular type.

Example 3

Consistency between two or more call control protocol message fields or parameters. Internal consistency tests look for two or more items of signaling data and behavior that should be related in a specified manner. For example, when field A is present, field W should also be present and contain a value within a particular range. In a more specific case, in a SIP Invite message the IP address associated with the domain of a caller's URI is determined and a search is performed for a match of subnet with the media IP address specified for the caller; or, in an SS7 ISUP Initial Address Message, the user-provided calling number should normally have the same area code as the charge number.

Example 4

Unexpected event. There are events that, while valid within the call control protocol, are unusual and suspicious. In one example described above, if a SIP Invite message is received from the caller, especially soon after the subscriber has accepted a call. In another example, in SS7 ANSI ISUP, if a call is ended by receipt of a Release Complete message instead of the Release message normally expected. In a further example, if the caller abandons the call, that is, disconnects, within a brief interval before or after the subscriber deflects the call to the MS 108 due to a no answer condition, which may indicate a caller avoiding the MS 108.

Example 5

Behavior of the subscriber or caller. Examples have been described above for: caller abandon; caller refusing an invitation to leave a message or to enter an identity or security code; rapid subscriber disconnect after accepting the call; explicit subscriber rejection of the call or deflection to the MS 108; analysis of the content of a message left by the caller; among other such tests of timing, duration, reaction to treatment, and the like.

Example 6

External condition. A common condition of this type is the time of the event. For example, a test for time between 12:00 AM and 6:00 AM, to more aggressively score callers, even those that are otherwise wanted. Function tests can ensure that these otherwise wanted callers, which may be on the subscriber's white list, are not added to the Signatures database 126 by assigning a weight as low as 0 to this event, while also constructing a function test that logically combines this function test result with other suspect conditions. As a further example, a function test that increases its result based on the time of day, so that calls at peak telemarketing times, such as 5 PM to 8 PM, give a positive result. Other external condition tests may also be implemented.

It should be understood that the preceding enumeration of function test categories is not complete and does not preclude other categories of function tests.

When a call event is detected, the Call Director 110 collects all the possible function tests for that call state and event (550). Those function tests are predefined by the service provider, and/or the subscriber. They are either coded in software or in an abstract higher-level notation, such as Regular Expressions. Reference in these tests to specific data items is by direct inspection of signaling messages, media content or the records of the Call State database 120, or in the case of abstract notation the Call Director 110 provides naming conventions for each of these data items in a manner well understood in the programming art.

Each function test is an evaluation of the suspect nature of signaling data, media content, or behavior of the subscriber or caller, and collectively referred to as call data. Such function tests can be dependent on the results of other such tests, as will be further described, and in no case do they require access to call data associated with other calls, but may access signatures associated with other calls that match a signature of the current call. That is, each function test is an evaluation of an aspect of the current call. Once collected, the functions are ordered by precedence. Precedence is determined by a dependency of one function test on a result of another function test, in essence requiring a hierarchy. Such precedence ordering is understood in the art and is used, for example, in systems such as spreadsheet applications where certain cells can only be evaluated after certain other cells have been evaluated.

Each function test is evaluated (554) in the precedence order until all function tests are evaluated (556).

The result of each function test is normalized to a common range where at one extreme a function test value indicates that the current call is certainly not suspect, and at the other extreme the function test value indicates that the current call is certainly suspect. A mid-point result, which is an arithmetic average of the extreme values, represents an undecidable result. The function tests are designed to conform to those definitions to achieve consistent results. Further, it should be understood that a function test does not necessarily yield a continuum of result values on a numeric interval between its extremes. Discrete results are possible, and such discrete result possibilities need not be equidistant from adjacent results. As an example, a function test may give a result from a member of the set of discrete numbers $[-1.0, -0.2, 0.0, 1.0]$.

Whether such result possibilities are continuous or discrete they do not affect previous or subsequent evaluation steps.

While any range of normalized values is permissible, in one embodiment of the invention a range of −1 to 1 is used, and thus the mid-point average is 0. It should be understood that any other such range is permissible if it is used consistently throughout.

Where the available data does not permit a function test to be performed, such as lack of a signaling message field, the test is skipped and the result is null. A null result is not to be confused with the mid-point average, or any other numeric value in a range of normalized results. It is rather an indication that there is no numeric result for the function test. The use of null results is described below.

When a null function test result occurs, it may be due to data that is absent in a call control signaling message. If such data is absent but the protocol or interface could provide it, this may be suspicious and can be taken into account in the associated function test or in another function test that checks for null results from certain function tests. Therefore, the methods in accordance with the invention take into account the capabilities of various call control protocols, such as SS7, SIP, SIP-T, PacketCable CMS, and H.323, and identified network interfaces that may have been provided by the Gateway, as described above. For example, some mobile networks and international gateways provide limited signaling data due to the nature of the interfaces with which they are provisioned.

Each function test that has a non-null result can optionally extinguish the result of one or more other function tests (558), whether those other function tests are internal or external to that function test. Extinguished results become null. The purpose of this is to permit a function test that returns a result of higher quality (superior) to override others of lesser quality (inferior), rather than compete with those other function tests in the weighting of results. This ensures that inferior results do not dilute an importance of superior results, while allowing the inferior result to stand when the superior function test has a null result. The results of all function tests are stored in the Call State database 120, including null results.

Figure 11:
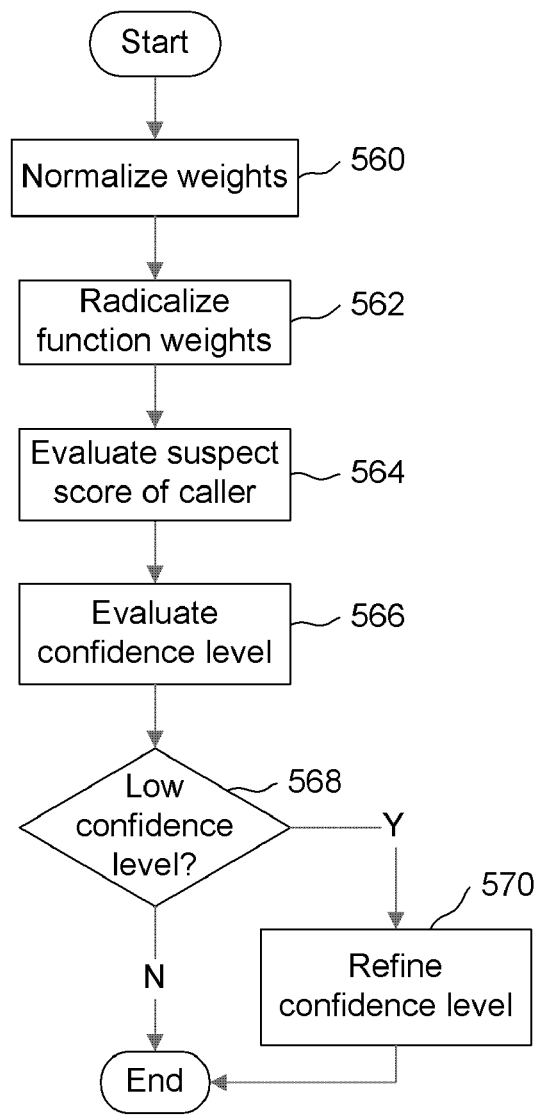
FIG. 11 is a flow chart illustrating an algorithm for computing Suspect scores in accordance with the invention.

FIG. 11 is a flow chart illustrating an algorithm for computing Suspect scores in accordance with the invention. The suspect score of a call is a cumulative evaluation of all weighted function tests up to a current call state and event. It is generally recalculated and applied whenever a set of one or more function tests are evaluated, as described above with reference to FIGS. 7-9. In accordance with the invention, each suspect score is computed as a cumulative total of all function test results for the call, and not only to those function tests most recently evaluated. The objective is to refine the suspect score as the call proceeds.

Each function test has an associated weight that is an indication of its relative importance in the evaluation of the suspect score. In one embodiment, the weights are positive real numbers. In a well-managed implementation, the setting of these weights is coordinated to provide a reasonable measure of relative importance of the various function tests. The weights of all function tests performed up to a given point in the call are retrieved to compute a suspect score.

Before the suspect score can be evaluated the function weights must be normalized (560). This is done to constrain the suspect score to the same range defined above for each function test. To achieve this arbitrary weights and null function test results must be taken into account. First, a sum of the weights of the function tests that have a non-null result is calculated. Each weight of this set of function tests is divided by the calculated sum of the weights. This yields a normalized weight for each non-null function test. In this example, normalized means that the sum of the normalized weights is 1.

The raw, weighted suspect score is: $2*(SUM(Fi*Wi)/N)-1$, where i is in a range of from 1 to N, Fi are the function tests with a non-null result, Wi are the normalized weights of the corresponding function tests, and N is the number of non-null function test results. The resulting sum is a real number in the range −1 to 1. By means of a trivial example, we can see that if every one of this set of function tests is 1 then the result of the shown calculation is 1, and it is 1 only in this case. This is similarly true for −1, but is not true in general for any other combination of function test results.

It is also possible to give a further bias to Fi to avoid swamping or dilution of low or high tests versus less-decidable tests (those near 0). The added bias is designed to give higher weight to more certain test results, such as those close −1 or 1, and lower weight to those near 0. For example, a properly formatted call control message that is internally consistent and with a calling number that is only somewhat suspect, but the caller left a message that is certainly characteristic of a commercial message. To increase the certainty of the suspect score calculation, a further set of calculations are used. Certainty means that the function test results are radicalized (562) to create greater alignment with the typically small number of possible outcomes of actions by the Call Director 110 at decision points in call State processing.

Radicalization is analogous to increasing a contrast of a gray-scale picture to accentuate light and dark areas; positive and negative test results are accentuated to reduce ambiguities while retaining the suspect/not-suspect bias of a function test result. The choice of a formula to apply must meet the needs of the service provider or subscriber. For example, a softly biased formula is: $Fi\text{-}new=SIN(90*Fi)$, where SIN is the sine trigonometric function with its argument in degrees. If Fi was −0.6 its new value is approximately −0.81, if Fi was 0.5 its new value is approximately 0.71, while if Fi was 0 it remains unchanged. As can be seen in this example there is a tendency in this formula to pull moderately suspect and non-suspect results towards their respective extremes.

By way of another example, a more extremely biased formula is: for $Fi\leftarrow-0.2$, $Fi\text{-}new=(1+(Fi^{}(-3))/4-1$, for $Fi>0.2$, $Fi\text{-}new=1-((1-Fi)^{}(-3))/4$, for $-0.2<=Fi<=0.2$, $Fi\text{-}new=0$. If Fi was −0.6 its new value is approximately −0.96, if Fi was 0.5 its new value is approximately 0.95, while if Fi was 0.1 its new value is 0. The function Fi-new is discontinuous at −0.2 and 0.2. The degree of radicalization can be adjusted by varying the exponent and coefficient.

Radicalization of function test results can be applied to the results of any number of function tests, and is not necessarily universally applied to all function test results.

After function test weights are radicalized, the suspect score can be calculated (564). For N non-null function test results the baseline suspect score is $SUM(Fi*Wi)$, where i ranges from 1 to N. The baseline suspect score can be further radicalized as earlier described for greater certainty in treatment selection.

Consistency of the suspect score calculation is important because the thresholds set by subscribers and the service provider to determine actions taken by the Call Director 110 at various points during call state processing are set independently of suspect score calculations. The above described method of determining the suspect score and the normalization of the suspect score is one way to achieve this consistency.

Confidence in the suspect score analysis is determined (566) from the number of function tests that can feasibly be performed, their weights, and the certainty of those function tests. Certainty is determined by how close the result is to an extreme value, that is, in one embodiment, −1 or 1. The confidence level will be taken into consideration by the Call Director 110 when action based on the suspect score is required.

To calculate the confidence level, the weights of all non-null function test results are summed. SUM(Wk) can never exceed 1, where Wk are the normalized weights of the non-null function test results. The greater the number and importance of function tests, the higher the confidence level in the suspect score. As a next step the logical sum of the unweighted function test results is calculated, where values less than 0 are assigned the value −1 and the values greater than 0 are assigned the value +1, using the formula Cr=SUM((Fk<=0)*−1)+SUM((Fk>0)*1), where the conditional tests '<=' and '>' take on the values 0 or 1 for true and false values, respectively, and k ranges from 1 to M, where M is the number of non-null function test results. Cr is a value between −M, the lowest possible confidence and +M, the highest possible confidence. This is next normalized to a value between 0 and 1 with the formula C=SUM(Wk)*(Cr+M)/(2*M). Cr is the raw confidence level and C is the confidence level. With this formulation the confidence level will tend to be low if there are few function test results, or a few highly-weighted function test results are null.

As can be seen from the confidence level calculation, there is tendency for a suspect and a non-suspect function test result to offset each other, which is the desired effect. This is only problematic if it occurs frequently, and may indicate a need to refine the function tests or their weights, or that function tests should be added or some should be removed. Low confidence levels result in poor accuracy in the decisions made by the Call Director 110 about whether a call is wanted or unwanted.

If the confidence level is determined to be below a specified threshold (568), the confidence level can be refined (570) using the following exemplary procedure. All function test results that are within a specified interval around zero are eliminated, which is the value of an undecidable test. An example is to eliminate all results between −0.4 and +0.4, the exclusion interval, understanding that any interval can be applied, and the exclusion interval is chosen based on achieving acceptable outcomes for the local environment. These results can be either the raw function test results or the weighted function test results, with or without radicalization, provided that all results are tested using the same weighting method. The confidence level is then recalculated as per the above description, with M now reduced to the number of function test results that have not been eliminated by this procedure.

Further iterative refinement per the above procedure is permitted if the confidence level remains below the threshold. This is done by increasing the size of the exclusion interval. Typically such iteration should not be done since there is an increasing risk of a misleading confidence level by, in effect, amplifying uncertain results. As noted above, if such outcomes occur too often, it may be an indication that the function tests need to be adjusted or changed.

As an alternative to the above-described confidence level calculation, suspect function test results can be isolated, that is those that are greater than 0, and their weights summed. Therefore, C=SUM(Wk)*(SUM(Fk>0)), where k ranges from 1 to M as described above, but all function test results and weights (Wk and Fk) where Fk<=0 are excluded. This method excludes cases where there may be enough function tests of a non-suspect nature for what should be suspect calls, that the overall confidence level is diluted by such results. That is, only the weights of the suspect results are considered.

It should be understood that other algorithms may be used to achieve a similar outcome of establishing a confidence level based on available information. Other confidence level formulations that utilize available test data are also within the scope of the invention.

As described above with reference to FIGS. 7-9, when there is a test to determine if the call is wanted or unwanted, both the suspect score and confidence level are tested against predetermined thresholds. Those predetermined thresholds can be set to any value within the parameter range, which in one embodiment are in the range of −1 to +1 for the suspect score, and 0 to 1 for the confidence level. If both the suspect score and confidence level are above their respective thresholds the call is determined to be unwanted. Otherwise the call is considered wanted.

In this algorithm the highest barrier is to reach the outcome of an unwanted call. This is to protect against a detrimentally high incidence of false positives, which in the field of real-time communications is generally considered less desirable than false negatives. That is, it is preferred to let some unwanted calls through to the subscriber rather than send potentially wanted callers to special treatment. As a wanted call is allowed to proceed, however, it is further tested at each call state and event to improve the result, and as will be explained below with reference to signatures, the results are further improved by combining the results of calls to many subscribers. Furthermore, since the suspect score and confidence level are available during call treatment, it is possible to ameliorate the possibility of a false negative by taking actions that are less drastic than outright blocking the call, as has been described above with reference to FIGS. 7b and 8c.

Figures 12, 13:
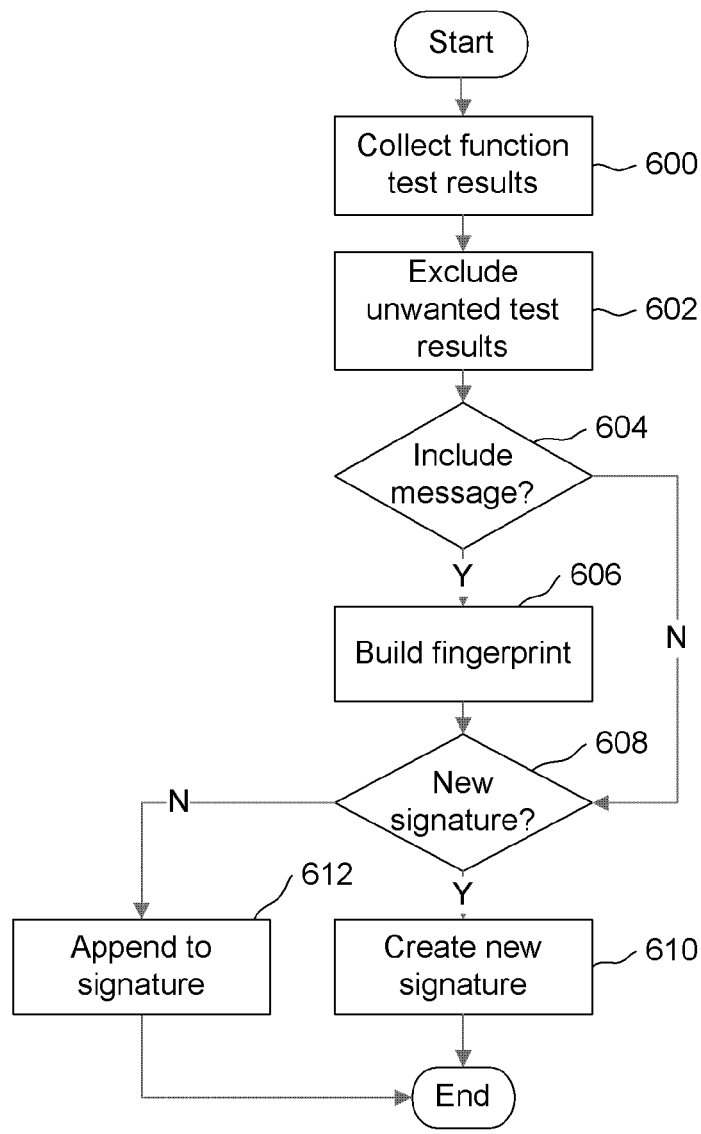
FIG. 12 is a flow chart illustrating an algorithm for building signatures in accordance with the invention.
FIG. 13 is a table illustrating an exemplary structure for a record in a Signature database in accordance with the invention.

Build Signature—FIG. 12 is a flow chart illustrating an algorithm for building signatures in accordance with the invention. Signature is a term that is used in email spam and computer virus screening. In those fields, the signature is typically a set of attributes that reliably identify a message as spam or a file as containing a virus or other malicious content. The use of signatures in accordance with the invention is similar, however there are important differences. First, the data and behavior from which signatures are derived are specifically designed to permit real-time call screening. Second, the way in which signatures are used to perform call screening must accommodate the suspect score and confidence level due to normally-encountered variations in calls coming from the same caller or the same class of callers.

Signatures are designed to make unwanted call and bad actor identification reliable and accurate. The richness of call control signaling data and behavior is exploited. A signature is created for every call. The signature is constructed from the content of the call control messages associated with the calling party and from the results of function tests, in the manner which will be described below. Each such item in the signature is called an attribute.

The signature alone does not indicate whether a call is wanted or unwanted. The signature provides a set of attributes that can be used to screen future calls that exhibit a match to an earlier-constructed signature that was determined to be a wanted or an unwanted call. To this end, signatures are utilized by the Call Director 110 to determine if calls are wanted or unwanted, and how to handle such calls.

Signatures are built in stages, and each stage is an event in a call state, as was described above with FIGS. 6-9. At each such stage, the Call Director 110 collects the set of function test results (600) that are indicated as required for the signature. This set can include results of all function tests performed to that point in the call, or a subset of those results (602). For example, only those results which are greater than 0.8, have a weight greater than the average weight of all the function test results, and a confidence level greater than 0.5 may be selected. Other inclusion criteria that are determined by the service provider to be of importance in the screening of calls may likewise be used. Each function test and the function test result together form a function test attribute 652 (See FIG. 13) of the signature 650, and the set of all function test attributes 652 form the function test attribute portion of the signature 650. This flexibility allows refinement of the signatures 650 to best fit the local environment and the evolving nature of tactics used by unwanted callers.

While the focus of the above example is on the building of signatures 650 for unwanted callers, signatures 650 may also be used to identify wanted callers. To accomplish this, function test results that exemplify any function test used to determine that a call was wanted by the subscriber, and a field is added to the Signatures database 126 that identifies each signature 650 as being associated with a wanted or unwanted caller. The description that follows respecting the use and manipulation of signatures 650 focuses on signatures 650 for unwanted callers, however it should be understood that the description also equally applies to wanted callers, if desired.

If an event for a given call state includes the receipt of a call control message from the caller, the call control message contents may be used to further extend the signature 650. Not all such call control messages have screening value since they may contain little data that is characteristic of a caller. The most important call control message is the call offer message since it contains the bulk of the signaling data associated with the caller, and it is at the call offer stage that screening is most useful to the subscriber. Other call control messages can be included in the building of signatures, as specified by the service provider.

For every call control message which will be included (604) in the signature, a fingerprint is built. Each fingerprint is a set of attribute name and test field pairs. An attribute name and a test field pair is referred to as a fingerprint attribute 654 (See FIG. 13). The fingerprint attributes 654 form the fingerprint part of a signature 650. Each fingerprint attribute is constructed in a manner similar to that used for function test attributes 652, and are defined in software or using an abstract notation, for example. A fingerprint attribute 654 can refer to a single protocol-independent or protocol-specific field or parameter, or can refer to two or more fields or parameters. The value of the test field of the fingerprint attribute can be in one of the following forms: a true or false logical value; a numeric or textual value; a range; or, a subset. Fingerprint attributes typically fall into one or more of the following categories: a call control protocol or variant; the presence of one or more fields or parameters; or, a field or parameter value, whether an exact value match, textual or numeric value range, or textual pattern match.

Examples of fingerprint attributes 654 include: protocol is SIP 2.0; the Tag field in a SIP Invite message header has the same (specified) value in every call; a calling number is absent; the II digits in an SS7 Initial Address Message indicate a payphone or prison phone; the name portion of the caller identity includes the text "Anonymous", or a URI portion includes the text ".info"; a specific ordering of fields or parameters where such ordering is not mandatory; and, a specific set and order of codecs in a SDP of a SIP Invite message.

It is apparent that a large number of fingerprint attributes 654 can be constructed, and that it is desirable to constrain the number of those fingerprint attributes 654 for reasons of performance and efficiency. It is also apparent that any arbitrary limit on the quantity of fingerprint attributes 654 may preclude signatures 650 for some or many of the total set of unwanted callers, especially if such unwanted callers become aware of the fingerprint attributes 654 being used. It is also apparent that one can only determine that a protocol field or parameter is not being used in accordance with the protocol when that protocol field or parameter is a fingerprint attribute 654 of a signature 650.

If a call does not yet have a signature (608), that is this is the first event in a call state in which there is a need to build a signature 650, a signature 650 is built (610) using the function test attributes 652 and all of the defined fingerprint attributes 654. The fingerprint attributes 654 include a set of generic attributes, which are defined as the existence and value of each of the fields or parameters of the call control protocol in use. The generic attributes need not be exhaustive of the full range of possibilities, and can be restricted to a subset of any size. The use and manipulation of these function test attributes 652 and fingerprint attributes 654 for searching, matching and maintaining signatures will be described below in more detail.

If the signature 650 for this call exists, those attributes associated with the present call state and event are appended (612) to the signature 650. The signature 650 built is associated with the present call and caller, and further is only associated with the particular subscriber offered the call by the caller. A new signature 650 is not typically used to screen calls to other subscribers, or even necessarily to screen calls placed to the called subscriber.

As has been described above, signature attributes 652, 654 can be added, modified and deleted. Such actions have an impact on the procedures for signature searching. Specifically, attributes 652 and 654 in earlier created signatures 650 may, subsequent to such a change, differ or no longer exist, while future calls can include attributes 652 and 654 not associated with any earlier created signature 650. The potentially negative impact of such changes can be minimized. This ensures that signatures 650 can be evolved and improved without disrupting the call screening functions of the Call Director 110, provided that such changes are introduced gradually rather than many at one time.

Signatures 650 built as described above with reference to FIGS. 12 and 13 are stored in the Signatures database 126. Each record in the Signatures database 126 contains all data that makes up a signature 650.

FIG. 15 is a table illustrating an exemplary structure 720 for a Signature database 126 in accordance with the invention. The Record Index field 722 is a unique identifier for the record, and is assigned when a signature 650 is first added to the database. In the example shown, the record indexes 722 are shown as ordering the records in descending order of the index. This is not necessary but can facilitate certain search functions if the Record Index 722 is derived from a clock which would cause the records to be ordered from most recently added to the oldest. A record can be retrieved directly by its Record Index 722.

The Signature field 724 contains the signature 650 as earlier described. It is a simple copy of the signature 650 built from a call when it is first added to the Signatures database 126, and it can change due to subsequent events, as will be described below.

The Call History field 726 references all calls that match the signature 650, where such references are pointers to the Call History database 124 or are copies of required key fields from Call History database 124 records, such as: time call offered; caller identity; user identity; and other fields, as required.

The Threat Level/Phase field 728 contains a numerical threat level and a phase used in signature life cycle procedures, as will be described below in more detail.

The optional Disposition field 730 indicates whether the signature 650 is one that is wanted or unwanted. If the particular instance of the call screening services covered by this invention only require the tracking of signatures of unwanted callers, then this field can be omitted from the Signatures database 126.

The Category field 732 contains a category of an unwanted caller with which the signature is associated. Examples of categories can include: personal; charity; political; survey or poll; commercial; fraud; and the like. The set of categories should be kept reasonably small to simplify category-based treatment that the subscriber may want to specify, and to avoid confusing the subscriber with too many choices during subscriber feedback, which may result in a signature being placed into two or more categories by subscribers providing feedback, which dilutes the effectiveness of feedback.

The Reason field 734 contains a primary test result or other factor that caused the signature 650 to be added to the Signatures database 126. If a particular reason does not exist, this field can be left blank.

The User Votes field 736 contains the identities and votes of all subscribers that have provided feedback on calls referenced by the signature 650. This includes a flag against votes that have been determined to be due to abuse of the subscriber feedback mechanism. Feedback may include a disposition and a category.

The utility of the Signatures database 126 can be further improved by sharing signatures 650 with external databases, including those in other networks that belong to other service providers. This can improve the results of signature-based call screening for the subscribers of mutually-sharing databases. Each network can identify unwanted callers sooner because an unwanted caller may have first called the other network's subscribers, and identify them with greater accuracy due to the larger pool of subscribers.

In addition to Signature databases 126, signatures 650 can also be shared with other specialized databases, such as those, for example, that contain a list of caller identities of charities, or other categories of callers. This supplements the subscriber feedback mechanism, and increases the utility of category-based call screening for subscribers.

FIG. 14 is a flow chart illustrating principal tasks performed during signature sharing in accordance with the invention. Data is imported from participating external databases (700). Data is likewise exported to the participating external databases (702). The process ends when all databases (704) have shared their data. For every participating pair of Signatures databases 126 there is a scheduled interval when they connect to share data, or one Signatures database 126 may notify another when it wishes to connect. These connection mechanisms, along with any security features including encryption, are well known in the art of database synchronization. If the Signatures database 126 is not available for such connection at the time designated or when notified, the connect can be deferred, or any data transfer from the external database is stored in a buffer area, such as a mass storage device separate from the Signatures database 126, for later processing.

Each record imported must be searched for in the receiving Signatures database 126. If there are matches, the most relevant signature is selected. A higher threshold for relevance is set for this test than is ordinarily used in signature searches. Constraint loosening in the search is not permitted, because there is less control over the function tests attributes 652, fingerprint attributes 654 and other factors in external networks. Risks are also reduced by only accepting signatures that are bad actors, i.e., those with a valid caller identity or call source, which also simplifies subsequent signature searches.

If the threat level 728 and phase of the external signature are more severe than that of a matching signature 650, this data may be changed in the matching signature 650, since the threat evidence is higher in the external network. The threat level and phase are not normally reduced if they are lower in the external record, because that would compromise the results of local analysis, and there may be more threat evidence in the service provider's network than in the external network.

If the external database being imported is a category database, these records are either stored in a section of the Signatures database 126 separate from other signatures 650, or they can be merged with the other records. If kept separate, and if there is more than one external category database, all of these databases are merged into a single database. The existing category section of the Signatures database 126 is then replaced with the new, merged category database.

If the records are merged, each record of the imported database has a signature field 724 and a category 732. If there is a signature 650 in the Signatures database 126 that matches, the category field 732 is examined to determine if it is populated. If there is a match the threat level/phase 728 is changed to a maximum value and the threat level/phase 728 is changed to high threat. If the category field 732 is empty or different, the category is changed to that of the external record and the threat level/phase 728 is changed to the maximum value. If there is no signature in the database with the matching signature 650, a new signature record is built, with category 732, and threat level/phase 728, as described above. This new record is assigned to the call offer call stage but with no attributes other than caller identity.

When exporting the Signatures database 126, all subscriber information is removed (702) from each record, so that there is no risk of compromising subscriber privacy. Call History database 124 references are replaced by counts of calls of both wanted and unwanted disposition, and all subscriber feedback is removed.

Figure 16:
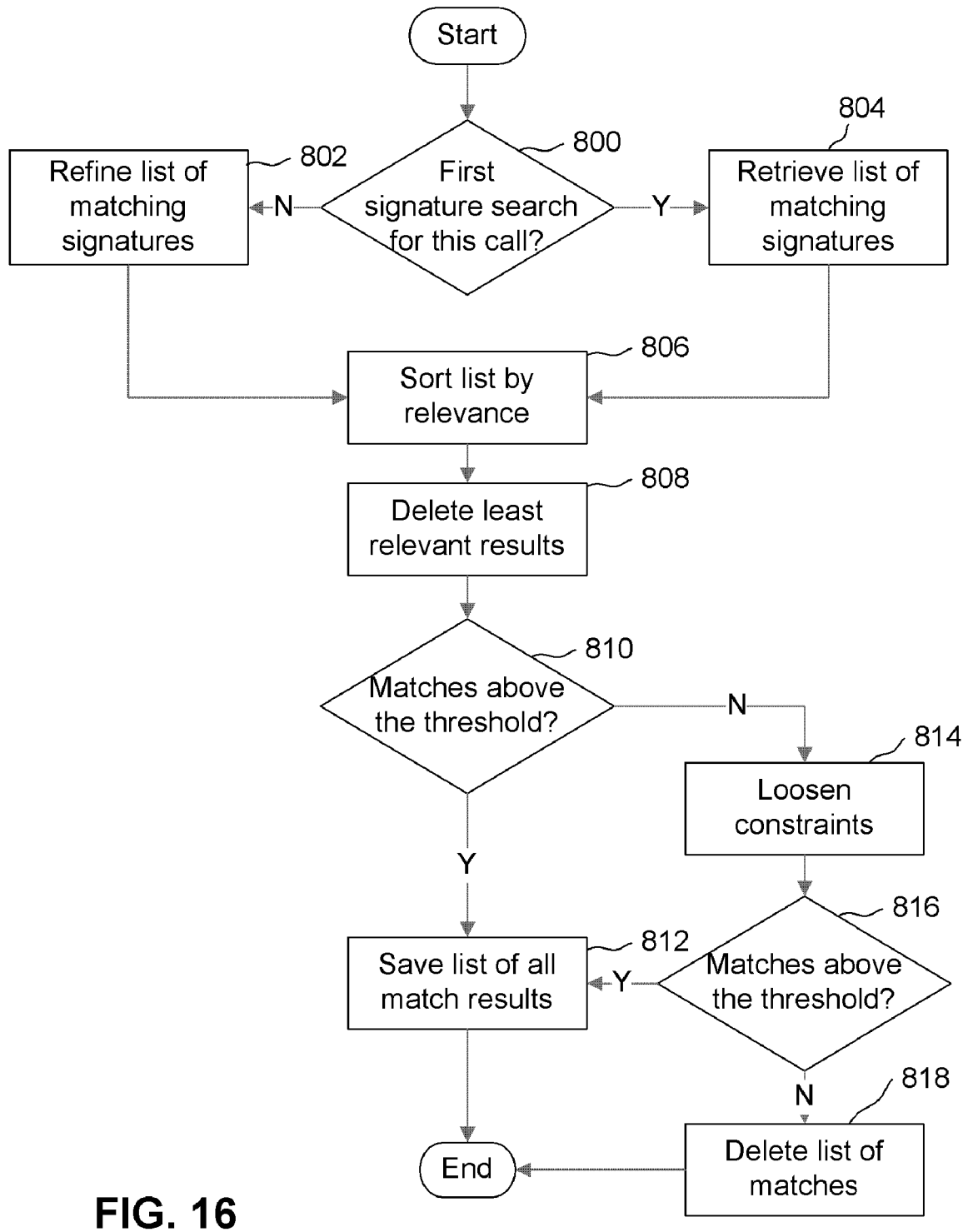
FIG. 16 is a flow chart illustrating principal tasks performed during preparing a response to a signature search query in accordance with the invention.

FIG. 16 is a flow chart illustrating principal tasks performed during a signature search in accordance with the invention. Signatures 650 are an additional method by which subscribers can elect to screen calls. A signature 650 match is primarily determined by the signature attributes 652, 654 and supplemented by other data associated with the signatures 650 in the Signatures database 126. When a signature 650 is first added to the Signatures database 126 there is only one call associated with it, and the attributes are built to be an exact match to what was discovered in that call, as described above with reference to FIGS. 12 and 13. An exact match for subsequent calls is of low probability since many attributes, and in particular fingerprint attributes 654, will differ between calls from the same source of unwanted calls. Since the caller identity and call source may not be known or of limited validity, there is the risk of false positives and false negatives in the signature search procedure.

For this reason highest relevance is given to signatures 650 having a caller identity or call source that closely or exactly matches the caller identity or call source of a call, if either the caller identity or call source is determined to be of high validity. In the next rank a search is performed for a close match of function test attributes 652, since a source of unwanted calls tends to exhibit the same suspect behavior for all of its calls. This means, for instance, that one call source could generate more than one signature 650 if that call source engages in more than one type of suspect behavior. This is anticipated and compensated for by the procedures associated with signatures.

After function test attributes 652 are matched, fingerprint attribute 654 matches are assigned the next lower level of relevance. More variation in the fingerprint attributes is expected when a signature 650 is new and has few calls associated with it, and in particular if the signature 650 has only one associated call. As calls accumulate, less latitude in the variation of these attributes is permitted during signature searches. Searches for fingerprint attributes 654, and to a lesser extent function test attributes 652, are governed by a constraint loosening procedure. As will be explained, the constraint loosening procedure adjusts certain attributes to increase a likelihood of finding a match, while reducing a probability of unjustified force-matching of a current call to an existing signature. Such constraint loosening is therefore sensitized to a relevance of a match before constraint loosening, the validity of the caller identity and call source, and any increase in subscriber feedback that refutes the results of the constraint loosening procedure, as well as the number of calls that have been associated with the signature. Flexibility is built into the search criteria, relevance measurement and constraint loosening procedures to allow for adjustment based on local conditions.

The purpose of the signature search procedure is to locate and sort by relevance one or more signatures 650 that match a signature of the current call to a specified set of matching criteria. There is no pre-assumption that the current call is suspect, and therefore there is no pre-assumption that any located signatures 650 signify that the current call is suspect. The signature of the current call is used as a search template in the search of the Signatures database 126. Only corresponding call stages in the Signatures database 126 are used for the signature search. Other call stages in the records of the Signatures database 126 are excluded from the signature search. In other words, a search is performed on the results accumulated to a current point in the current call. Signature searches can be performed at successive stages in the call, as has been described above with reference to FIGS. 6-9, and the size of the search template increases at each call stage.

If this is the first stage of the call for which a signature search is to be performed (800), which is typically the Call Offered state and receipt of a call offer message, a complete search of the Signatures database 126 is performed and any matching signatures are retrieved (804). If this is not the first stage of the current call, a previous search results list of relevant signature matches is refined (802). The search procedure is similar in either case, except that the list of records searched is smaller when the previous search results list exists and a query is not sent to the Signatures database 126.

As a first step in the search, matching signatures 650 are excluded if they do not include all of the call stages that are present in the signature 650 of the current call. Remaining signatures 650 are compared with only those call stages in the signature 650 of the current call. The remaining list of signatures is searched for signatures 650 with function test attributes 652 that match exactly the same list of function test attributes 652 in the signature 650 of the current call, and where those function test attributes 652 have the same sign, i.e., both are positive or both are negative. If no matches are found, signatures 650 may be included if there are up to a predetermined number of function test attributes 652 that are in one signature 650 or the other, but not both. This number should not be large, typically no more than one, and that one function test attribute 650 may only belong to a predetermined set that is deemed less critical, or is automatically determined to be less critical because the weight of the function test attribute 652 is low in comparison to other matching function test attributes 652. Furthermore, preference should be given to a mismatching function test attribute 652 that is present in the signature 650 of the current call over a signature 650 from the database, because the function test attribute 652 may be new or improved since the signature 650 in the Signatures database 126 was added to the database.

Signatures 650 that do not match the signature 650 of the current call are then removed from the list. This is done by first testing the validity of the caller identity and call source of the current call by determining whether either or both are above a predetermined threshold of their respective function test attributes 652. If the caller identity is valid, signatures 650 with a similarly valid but different caller identity are excluded. If the caller identity is not valid but the call source is valid, signatures 650 with a similarly invalid caller identity, but with a valid and different call source are also excluded.

Fingerprint attributes 654 for the remaining list of signatures 650 are compared, but the size of the list the list is not reduced based on this comparison. For each non-generic fingerprint attribute 654 a match is determined if the specified value is of the same type. The comparison performed may include: existence; exact match; range match; subset match; enumerated list match; or matching procedures that may be defined. A count is accumulated of the non-generic fingerprint attributes 654 that: match; do not match; and those that are present in either the current call or the tested signature 650, but not both. For generic fingerprint attributes 654 the same procedure is performed, but the match is limited to: existence; exact match; or no match.

The above-described procedure for searching the Signatures database 126 for matches, is exemplary only and does not preclude other search procedures based on the same data and attributes.

The remaining signatures 650 are sorted (806) in order of relevance. In one embodiment, the remaining signatures 650 are sorted in descending order of the following relevance criteria: 1) an exact match of function test attributes 652 and sign of the attributes; and, within that list sort by: valid and matching caller identity; valid and matching call source, invalid caller identity and call source; and ascending order of matching function test attributes 652 that have a mismatched sign; 2) matching sign of function test attributes 652 for signatures 650 with function test attributes that match, but with one or more mismatching function test attributes 652; and, within that list sort by: ascending number of function test attributes 652 that are in the signature 650 of the current call, but not the signature 650 retrieved from the Signatures database 126; ascending number of function test attributes 652 that are in the signature 650 retrieved from the Signatures database 126, but are not in the signature 650 of the current call; 3) ascending order of matching non-generic fingerprint attributes 654 with mismatched values, and within that by descending order of matching non-generic attributes with matched values, and within that by descending order of matching generic fingerprint attributes 654 with matching values. The relevance of specified non-generic fingerprint attributes 654 can be further weighted so that they are sorted to a higher relevance. If so, the relevance value is highest for the first signatures 650 in the sorted list. The relevance is decremented for each major sort criterion, and within each major sort criterion is decremented by minor sort criteria. For example, in the above-described sort procedure there are 3 major sort criteria. Values 3, 2 and 1 are assigned in successive order for an exact match of minor criteria. Successively lower values are assigned per order within each major sort criterion, but the value assigned must not be lower than the highest value of the next lower major criterion. This value assignment can be relative to a signature's position in the list, or in accordance with a predetermined algorithm.

As an example of this sort procedure (806), the maximum value 3 is assigned to the relevance of a signature 650 that exactly matches in all function test attributes 652, caller identity and fingerprint attributes 654. If there are 4 other signatures within this major criterion and relative ranking is used, values of 2.8, 2.6, 2.4, and 2.2 are assigned, in descending order of each signature's position in the list.

A relevance value may also be calculated using: the number of calls associated with a signature 650; subscriber feedback that reinforces or contradicts the relevance of the signature 650; by the elapsed time since the last call associated with the signature 650; or any other relevant factor. This permits the relevance values to be further adjusted to give preference to signatures with a greater volume of recent activity when there is a close match of function test and fingerprint attributes 652, 654, and to use subscriber feedback that might also affect the relevance calculation.

If it was determined (800) that this was the first signature search for this call, the list of matching signatures 650 can be large. A predetermined number of the most relevant matches can be retained, and any remaining signatures 650 in the list that have lower relevance are deleted (808). By ranking, refining and revising the relevance calculations in the above described manner, there is a tendency to eliminate signatures 650 with low relevance if there are signatures 650 with higher relevance. This is intended behavior, and is a means of ensuring that the most accurately matching signatures are used to screen calls.

If the most relevant matching signature 650 is above a predetermined threshold (810), the list of all remaining matching signatures is saved (812), regardless of the relevance of the signatures in the list.

If the most relevant matching signature is not above the predetermined threshold, a constraint loosening procedure is performed (814). The purpose of the constraint loosening procedure is to broaden the acceptable constraint for signature attribute matches, so that the relevance rating of the match is increased, such that at least one of the signatures will have a relevance rating above the threshold. The degree of constraint loosening is preferably small for each iteration of the constraint loosening procedure to prevent excessively broad matching, which can produce signature relevance ratings that overlap and may unintentionally capture calls that are not of the same type or source. The constraint loosening procedure (814) is ordinarily done once for each signature 650 in the list, but more iterations may be required if the degree of constraint loosening in each iteration is small. Constraint loosening applies to the data associated with the signature attributes, but not the logic of the function tests. Constraint loosening (814) can be performed as follows, depending on the type of data in the signature attribute: 1) a field/parameter with discrete values can be expanded to include a larger set (for example, expending the set of codecs from [G.711] to [G.711, G.729]; 2) ignoring a fingerprint attribute test that checks for such existence or non-existence of a field/parameter; expand a numeric/binary range of a fingerprint attribute to include a new value, provided, for example, that the new range is less than 20% larger, and the new range does not exceed 50% of the possible range; if the attribute is an IP address, loosen the address mask from 255.255.255.255 to 255.255.255.0, for example, which would identify a subnet in which targeted callers may reside rather than one specific device whose IP address can change between calls; and, reduce a textual range match in a fingerprint attribute to include a new value, provided, for example, the new range is not overtly ambiguous (examples of avoiding ambiguity include ensuring that a URI contains a complete domain name, or that a telephone number must be 10 digits in length and not be loosened beyond the 4 least significant digits (e.g. 806-555-1***, where * represents any digit from 0 to 9).

The permitted constraint loosening can be specified per fingerprint attribute to ensure best matching behavior for that fingerprint attribute. However, such specifications are normally only provided for generic fingerprint attributes. Those fingerprint attributes are permitted only: existence; exact match; or always different. Therefore loosening constraints for those match conditions is simpler. In the case of an existence match, loosening causes the fingerprint attribute to be ignored. In the event of an exact match, constraint loosening can only be performed for a different condition or by ignoring the fingerprint attribute. Constraint loosening can be applied to the caller identity and call source attributes, and when this is done the validity of these attributes is decreased. In one embodiment when constraint loosening is applied to caller identity or call source, it is applied to only one of them to avoid lessening the specificity of a signature since, such action could increase the incidence of false positives.

If the validity of the caller identity or call source is high, more aggressive constraint loosening may be preferred because the signature 650 is likely associated with a bad actor and the constraint loosening only affects a probability that the call will be offered to the subscriber. In a most aggressive form, all attributes other than the caller identity or call source, depending on which is of the highest validity, can be ignored so that all calls from the associated caller are of highest relevance. This is rarely desirable, however, because at least some function test attributes are desirably considered to permit a bad actor to be rehabilitated, as will be described below in more detail.

If a signature 650 is in the Signatures database 126 as a result of a category database import, the signature will normally have no signature attributes aside from the caller identity or call source. Consequently, those signatures 650 will always tend to be the most relevant when there is a match.

For signatures 650 associated with a small number of calls, and especially if there is only one associated call, constraint loosening (814) should be maximized for any mismatching attributes, but within constraints permitted for the type of signature attribute data as described by way of example above. The reason for this is that a new signature has only one set of signature attribute values. Many attributes, especially fingerprint attributes, cannot be precisely matched across different calls because the signature attribute data is typically not identical for different calls. As more calls become associated with a signature 650, constraint loosening should be reduced so that fewer signature attributes are permitted to be loosened, and the constraint loosening should be in increasingly smaller increments. After a predetermined number of calls, further constraint loosening should be restricted to a minimal increment size or disallowed entirely. The reason for this is that as a signature 650 ages, the signature should become finely tuned to the calls with which it ought to match. Further constraint loosening could cause overlap with other signatures 650 or to match calls that it should not match, therefore increasing an incidence of false positives. A signature 650 can also be marked as "locked" if contrary subscriber feedback indicates that previous constraint loosening yielded an undesirable result. A locked signature 650 is exempted from constraint loosening.

After constraint loosening on signatures 650 in the list is performed, and recalculation of the relevance of signatures 650 in the list is completed, it is determined whether there is a signature 650 in the list with a relevance that is above the predetermined threshold (816). If so, the list of all matching signatures 650 is saved (812). If not, the list of all matching signatures 650 is deleted (818).

For signatures 650 with respect to which constraint loosening was performed, a record of the constraint loosening that was performed and when it was performed is stored with the signature 650 in the call record. All of this data is stored in the current call's record in the Call State database 120 and not the Signatures database 126 because the call has not ended. Update of the Signatures database 126 occurs then the call state transitions to Null, as was described above in detail.

If constraint loosening was not required, the top matching signature 650 has a relevance close to the maximum value, the caller identity or call source is of high validity, and the number of associated calls is small, one iteration of the constraint loosening procedure may be performed on the fingerprint attributes of that signature. The purpose is to moderately expand the signature's applicability to other calls, by choosing appropriate attributes to loosen. For example, a SIP Tag field may be declared to be of a larger range than the value for the current call since it will ordinarily vary between calls, and it is desirable to ensure matching and high relevance for similar calls in future. If this constraint loosening is performed, it should be performed regardless of the subscriber's screening preferences.

This process of creating a signature 650 with a set of initial attributes that contain the call offer message contents, coupled with the constraint loosening procedure for subsequent signature matching, and biasing for signatures 650 with the tightest constraints is a method of increasing the utility of call screening in accordance with the invention. This adapts the signature search and matching procedures to new call data and changing caller behavior with no need for service provider or subscriber intervention.

FIG. 17 is a flow chart illustrating principal tasks performed during signature threat level and phase re-evaluation in accordance with the invention. When a signature 650 is first added to the Signatures database 126, the signature 650 has limited utility in call screening because any one call in isolation can be marked as suspect, even though the caller or source of such calls should not be screened in future. Some reasons for this have already been described, and include: impatient callers that abandon calls; unintended disconnects due to poor call quality; overnight calls for a rare but urgent communication; human error in interacting with the UA 102 such as pressing the wrong button; dialing a wrong number; etc.

Individual subscribers are not prohibited from screening their calls based on single call signatures if aggressive call screening is desired, but that will normally result in a high false positive rate. Call screening accuracy can be improved by accumulating data over many calls associated with the same signature 650. Data accumulation is fully automated, as are the identification of unwanted callers and the rehabilitation of unwanted callers if suspect behavior ceases.

Signatures 650 and bad actors, which are a subset of signatures, evolve over time and can be used by subscribers to screen calls using their call screening preferences. Signatures and bad actors are evolved as follows: measuring an intensity, volume and duration of suspect activity associated with each signature 650; sharing suspect scoring results among unrelated subscribers; monitoring call records of users that are not subscribers and are not monitored by the Call Director 110; and measuring a decline and termination of suspect behavior to permit an automatic rehabilitation of signatures and bad actors, and to eventually remove certain signatures 650 from the database.

Signature maintenance can be performed as a non-real time task and is therefore suitably done by the Record Analyzer 118, as described above.

As also described above, the identity of calls is recorded if the call is found to match a signature 650 by reference to the Call History database 124. A record is also made each time a subscriber marks a call as wanted or unwanted, and regardless of any such subscriber action the function test results for all calls are recorded. Therefore, each signature 650 may be associated with call history records of both wanted and unwanted calls.

As shown in FIG. 17, the Call History database 124 is periodically purged (850) of all call records that have passed a certain age, as well as all call records that are older than a predetermined time period determined to be useful for evaluation of signatures 650. Call Detail Records 128 are then merged (852) and a signature 650 is retrieved (854) from the Signatures database 126. Thereafter, a new threat level and phase are calculated (856) for the signature 650.

In one embodiment, the new threat level and phase are calculated (856) using weighted time segments. In order to define the weighted time segments 880, the calendar is divided into time segments 882 of equal length as shown in FIG. 19, where each time segment 882 is individually weighted 884 for assessing call activity. This has two advantages. First, times of day and days of week which are targeted by unwanted callers can be assigned greater weight. Second, other time segments can be assigned a low weight so that lack of unwanted caller activity does not dilute time-intensity scoring of signatures and bad actors. For example, a weight of 0 units can be assigned for Tuesday 1:00 PM to 2:00 PM and a weight of 5 units can be assigned for 5:00 PM to 6:00 PM. These time segments and weights can be adjusted to meet local conditions. Units are an arbitrary measure of weight set by the service provider.

To begin the recalculation (856) of threat levels for the signatures 650, a time period over which the measurement will be done is determined. Starting from the present time a weight 884 of each earlier time segment 882 is accumulated until a predetermined limit is reached or exceed. The predetermined limit may be, for example, 500 units.

For each signature 650 in the Signatures database 126, but excluding those that are category records which are in a separate section of the database, the following procedure is performed. Each call in the call history is allocated to a time segment 882 in which the call began. Calls in the signature's call history that started earlier than the start of the measured time interval and calls whose dispositions were due to feedback from users flagged for abuse of the voting system are excluded. A sum is accumulated for each of wanted 888 and unwanted calls 886 over the measured time interval. These sums are added together to determine the total number of calls for this signature 650 over the measured time interval.

If there are a sufficient number of subscriber feedback votes 886, 888, once potential abuse has been accounted for, those votes can be given greater significance than dispositions generated by the function test results. A reason for taking feedback votes 886, 888 into account is that subscribers who make the effort to vote are often motivated to do so by false positives or false negatives that impact their use of the real-time communication service. Therefore, the feedback votes can be an indication that the function tests require adjustment. Further, if the function tests are adjusted and the subscriber feedback was correct, a next recalculation (856) of the threat level and phase will tend to stop subscriber voting because the signature phase will change to one that accords with subscriber preferences. Therefore, as an interim measure the phase of the signature can be locked or the threat level reset to a minimum or maximum level, depending on whether the voted disposition is that of wanted or unwanted. If this is done, the service provider should be advised to investigate the function tests.

As a further check, if the contrary subscriber votes 886, 888 are received after constraint loosening, it is an indication that the constraint loosening may have been in error. The most recent instances of constraint loosening can be reversed after an onset of contrary subscriber voting. The signature 650 may also be locked to prevent further constraint loosening and the service provider may optionally be advised to investigate the problem. Regardless of such notification, the lock on constraint loosening will prevent a recurrence of the problem with that signature 650.

To augment threat level and phase recalculation (856) before the signature record is updated, records from an external billing or accounting system, referred to as Call Detail Records (CDR) 128, can be merged (852) into the call history counts, as indicated above. Since the number of subscribers that the Call Director 110 monitors may be a small proportion of the service provider's customers, the additional quantity of calls analyzed can improve the accuracy of the threat level calculation. However, since each CDR records contain less data than a record in the Call History database 124, their impact can be reduced by assigning each CDR call record a worth, for example, of 0.2 as opposed to a worth of 1 for those calls monitored by the Call Director 110.

To include CDR 128, the CDR files for the measured time interval are imported. Only CDR for the measured time interval are analyzed, because the earlier CDR have already added to the call histories of the matching signature 650. The measured time interval may also be adjusted to end prior to a current time because CDR may not be available up to the current time due to processing delay. Besides, calls that might otherwise be in the CDR may still be active and therefore not yet written to the CDR file.

The selected CDR are sorted to select all calls where the called party is a subscriber of the service provider. Since the bulk of the data in the CDR usually consists of fields and parameters associated with the call offer message, the function tests for that call state and event are applied to the CDR data. If call duration data is present, as well as an indication of which party disconnected, the function tests for the Active Call state for a disconnect event from either the called party, or the caller can also be applied. If the disconnecting party is not known this function test is deferred until later, as will be described below in more detail. From this analysis a signature 650 for the CDR is built using the procedure described above.

A signature search is performed using the signature 650 built for the CDR, however the search template is adjusted for function test and fingerprint attribute matches that conform to the data available in the CDR. If there is at least one match of sufficient relevancy, without performing constraint loosening, the most relevant match is selected. It is then determined whether this match has a function test attribute for the Active Call state, which measures disconnect timing. If so, and the CDR data for disconnect timing is available, we select the CDR function test for subscriber disconnect or caller disconnect, as appropriate, and perform the test. If the test result indicates that the call was suspicious, the signature is considered to be a match and the CDR is added to the call history for that signature 650 as an unwanted call, with an indication that it is a CDR and therefore not accessible in the Call History database 124. This CDR analysis as typically used never results in the creation or modification of a signature 650. It is instead most often used only for the evaluation of a threat level of already existing signatures 650, since creating new signature records from CDR analysis is prone to error due to the inability to apply many valuable function tests in comparison to real-time call processing by the Call Director 110.

Since the quantity of the CDR can be quite large, it is often preferable to sample the CDR so that only a proportion for which there are available computer resources are analyzed. The sampling can be random or deterministic. If deterministic, CDR may be chosen for analysis by selecting: a greater proportion of CDR for times during which unwanted calls are more likely; CDR for selected customers, such as those with numbers in a number space in which a war dialer is suspected to be operating due to subscriber feedback, as will be explained below; or, CDR associated with a particular caller or callers that exhibit certain attributes. Other criteria they also be used for CDR selection. An absolute or a relative calculation may be used to determine the new threat level for the signature 650. An absolute calculation compares the number of unwanted calls to a threshold, and if the number of unwanted calls is higher than the threshold the signature 650 is a threat. A relative calculation compares the ratio of unwanted and total calls to a threshold, and if the ratio is higher than the threshold the signature 650 is a threat. An absolute threshold can be dynamically adjusted to the size of the time interval or its weight in units used in the calculation (856). The thresholds are specified by the service provider. This calculation is applied to the signature 650 by determining its previous phase. The life cycle 870 of signatures and bad actors is divided into phases, as shown in FIG. 18. A new signature 650 begins in the promotion phase 874 with a minimum threat level that is greater than zero but lower than the threat threshold 872. For a signature in the promotion phase 874, if the measured threat is below the threshold 872, the threat level is reduced by a predetermined amount, referred to as a slope as will be described below. If above that threshold the threat level is increased by the same amount. The threat level cannot be reduced below zero. A signature 650 with a threat level that is reduced to zero can be deleted from the Signatures database 126 or it can be moved to the rehabilitation phase. After the new threat level and phase for the signature are computed, the signature is updated (858) and it is determined whether more signatures exist (860). If so, a next signature is retrieved (854) and (856)-858 are repeated. If no more signatures exist, processing ends.

As noted above, the amount by which the threat level is incremented or decremented is referred to as the slope, and is related to a geometric slope 874 as can be seen FIG. 18. A steeper slope causes more rapid promotion, both upward and downward. The slope is selected to achieve a rapid promotion to the threat threshold 872 so as to reduce the false negative rate, but not so fast as to unfairly penalize signatures 650 that are a low threat, or associated with calls only unwanted by few subscribers. The slope 874 should be proportionately lowered for shorter intervals between calculations (856) and raised for longer intervals between calculations (856), due to overlap in the measured time intervals. Alternatively, the slope 874 can be adjusted automatically to be inversely proportional, in a desired degree, to a time since the previous calculation (856).

While the lines shown in FIG. 18 are continuous, they are calculated in discrete steps of one threat level calculation interval as described above. Since the interval and slope can be specified by the service provider, there is no predetermined set of discrete steps, so therefore for the purposes of illustration a continuous line is shown that approximates the behavior of the threat level calculation (856) described above.

As suspect activity continues through subsequent threat calculations, a signature in the promotion phase may increase past the threat threshold 872. When this occurs the signature 650 is promoted to a high threat phase. The slope remains the same, but when the threat level reaches a predetermined maximum value 876, no further increases are possible. The choice of the predetermined maximum value 876 affects how much time is required to demote a signature below the threat threshold 872. As in the promotion phase, there is a predetermined high threat threshold for calculating whether a signature is a high threat during the measured interval. This high threat threshold can be different from the threshold used in the promotion phase, or the same unless the threat level is at the maximum value 876. This high threat threshold may be set low to require a higher standard of behavior from high threat signatures 650 before demotion occurs. The slope 874 can also be selected to achieve a similar result.

When a signature 650 in the high threat phase is demoted by cessation of suspect behavior, it will cross below the threat threshold 872 and be moved to the demotion phase. The slope and threat calculation threshold can remain the same as in the high threat phase or be different. A signature 650 in the demotion phase is said to be on probation. When the threat level of a signature in the demotion phase reaches zero, which is the minimum threat value, it is moved to the rehabilitation phase. The signature can be immediately removed from the Signatures database 126 or it can remain in the rehabilitation phase for a predetermined period of time, thus extending probation.

If the calculated threat level is above the threshold 872 for a signature 650 in the demotion phase the signature is rapidly elevated to the recidivism phase 878. This is an indication that suspect behavior has resumed. The slope in the recidivism phase is typically set steeper than in the promotion phase to prevent callers from attempting to subvert the screening system using calculated periods of low suspect activity. The steep slope quickly returns them to the high threat phase. The recalculation procedure continues until all signatures are processed, as determined at (860).

It should be noted that in spite of these automated procedures, the service provider is permitted to manually change any signature threat level, or even delete any signature 650 from the Signatures database 126.

If there is evidence of a bad actor or other signature 650 with particularly egregious behavior, the Call Director 110 may notify the service provider. This allows human intervention to, for example, block a bad actor's ingress to the network, and so protect the network and its customers, including those that are not subscribers, until the bad actor can be located and barred from further egregious activity. Such bad actors can include zombies, bot nets, and other networks that host bad actors and assist them in masking their activities.

Figure 20:
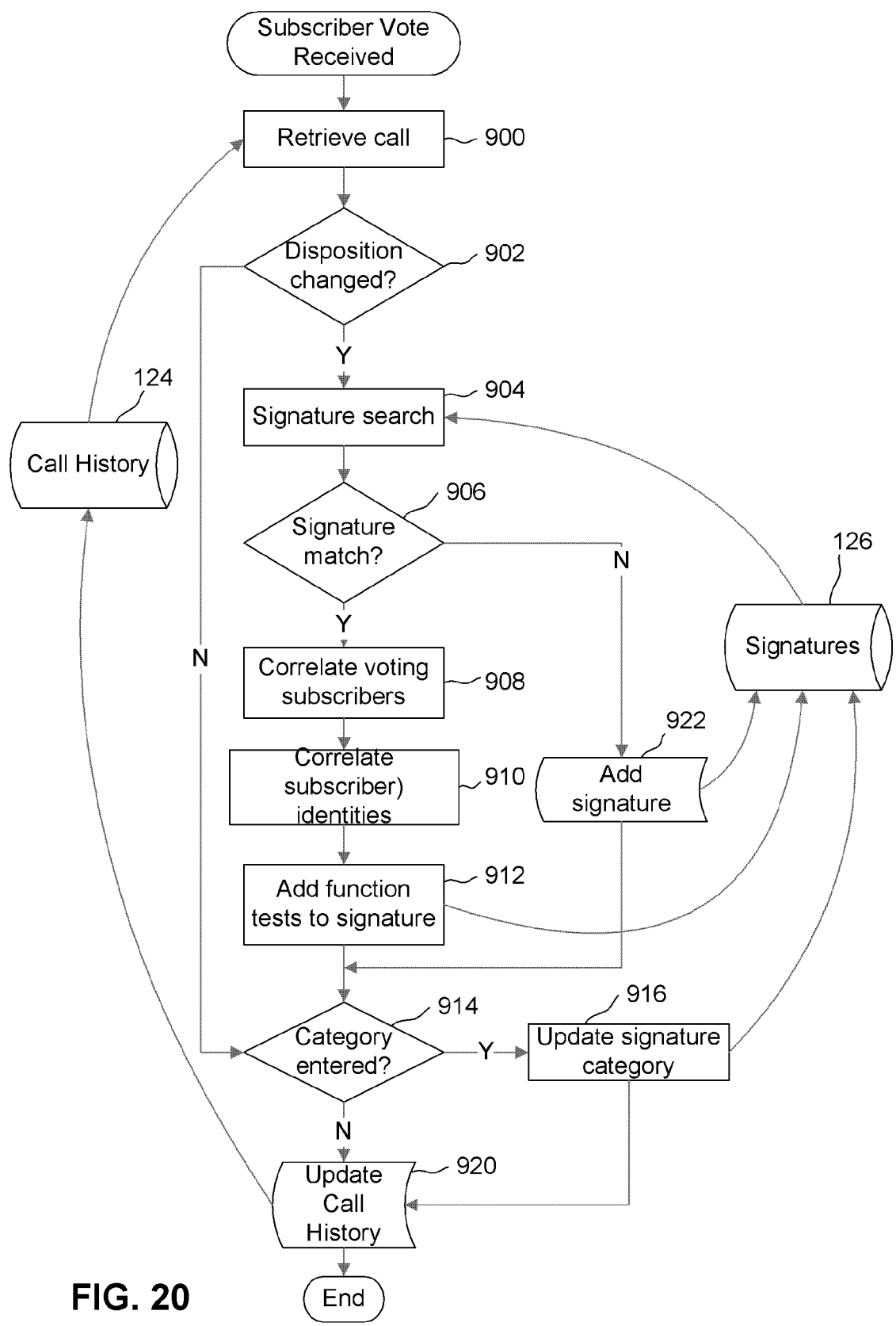
FIG. 20 is a flow chart illustrating principal tasks performed during evaluation of subscriber feedback in accordance with the invention.

FIG. 20 is a flow chart illustrating principal tasks performed during evaluation of subscriber feedback in accordance with the invention. The subscriber provides feedback by accessing the call history using the web interface 116 or any other interface provided by the service provider to permit the disposition of a call to be indicated as wanted or unwanted. Feedback from the subscriber may also be solicited during a call and after a call completes or is subjected to special treatment, if the UA 102 supports this interaction and the functionality is desired by the subscriber and supported by the service provider.

In order to provide feedback, the subscriber reviews a list of all or recent call activity, whether to one or more associated appliances or UA's 102, and per any search criteria which the Web interface 116 permits the subscriber to select. All selected calls are retrieved from the Call History database 124. Each call displayed may show the subscriber all or a subset of: caller identity; bad actor category; whether the call is indicated as wanted or unwanted, and if unwanted the reason for the determination; date and time the call was offered; call duration if it was accepted; any special treatment applied; presence of a message left by the caller; and, other data that may be by the interface being used. If certain data is not displayed, such as a private calling number, the subscriber is informed of this excision in the displayed data for that call.

If the Web interface 116 supports the capability and applicable media, the subscriber may select and download or review a message that was left by the caller.

The subscriber may opt to alter the disposition of the call from wanted to unwanted, or from unwanted to wanted, for any reason. The subscriber communicates this action by clicking on a "vote" button on a web interface 116, softkey selection, DTMF code input, or other method provided and in a manner well understood in the art. Action in response to subscriber votes can be performed: immediately; at a later time, including after the subscriber signs off from the interface; and, any such deferral does not affect the following procedure.

A change in call disposition due to such subscriber feedback is a useful means of refining the call screening algorithms described above, with the affect of increasing the accuracy of identifying unwanted and wanted calls for this subscriber and for all other subscribers.

As shown in FIG. 20, when subscriber votes are received for a call, the call is retrieved (900) from the Call History database 124. If the vote indicates that the call disposition changed (902) from wanted to unwanted or from unwanted to wanted a search (904) for a matching signature 650 in the Signatures database 126 is performed. If it is determined (906) that there is no matching signature 650 in the Signatures database 126, a signature for the call is built, as described above. The new signature 650 is added (922) to the Signatures database 126 using the procedure described above. Any associated function tests that pass the required threshold, including fingerprint attributes 654, retrieved from the call history record, are included in the new signature record. Other attributes are appended to the new signature 650 to indicate that: the reason that the signature is associated with an unwanted or wanted call is due to subscriber feedback; the subscriber's identity; and, the identity of the associated call in the Call History database 124. If it was determined (902) that the subscriber's vote did not change the calls' disposition the category entered by the user is tested, as will be described below.

If it was determined (906) that there was a matching signature 650 in the Signatures database 126, regardless of the particular change in disposition made by the subscriber, the signature 650 is processed as described below.

If the signature 650 has existing subscriber feedback attributes, it is determined whether there is evidence of abuse. The abuse filter searches for correlation (908) among voting subscribers, and includes thresholds for determining when a correlation exists. Subscribers are correlated when: they are explicitly associated with a common community of interest; one subscriber is in the other subscriber's permanent or dynamic white list; or where their call histories show previous contact; and there is a short time period over which the subscriber votes occurred. This correlation is performed among all possible pairs of voting subscribers, including the currently voting subscriber. If the computed correlation is determined to be above a predetermined number or involves greater than a predetermined percentage of the voting subscribers, either in number or within a specified period of time, the subscribers are considered to be engaged in abuse of the subscriber feedback feature of the system.

If a subscriber correlation is found, the feedback of the correlated subscribers is ignored. The feedback is, however, not deleted because that would impair a next use of feedback from other subscribers which may be similarly correlated. Further, ignoring the subscriber feedback does not affect the screening of calls from the caller targeted by the abuse, and so such calls are screened per the subscriber's stated preferences, which includes such subscriber votes that have been ignored due to suspected abuse. As a further measure, the service provider may determine that all feedback from subscribers engaging in such abuse will automatically be ignored for a specified period of time, regardless of the caller so targeted, or ignored on a permanent basis until manually restored.

Subscriber feedback abuse can either indicate that a caller is wanted or unwanted, and either can have deleterious effects on other subscribers of the screening services in accordance with the invention. In the case of indicating that a caller is unwanted, the subscriber feedback may unjustly impair the caller's ability to achieve real-time communication with any subscribers of the call screening services. On the other hand, subscriber feedback that indicates that a caller is wanted can allow a bad actor to continue to contact subscribers. Subscriber abuse of the first type may be a prank coordinated among a group of friends, while subscriber abuse of the second type may be a fraudulent attempt to impair the screening of unwanted calls from the targeted caller, possibly in collusion with that caller.

A further correlation is made among subscriber identities (910) to detect patterns such as sequential telephone numbers, commonly referred to as war dialing. Such war dialing may be an attempt to discover the identities of fax machines and open modems, or other telemarketer tactics. Such calls generally elicit a high suspect score and signature relevance, but in those cases when they do not, subscriber feedback is a further means of identifying the unwanted callers. This correlation of subscriber identities (910) is only performed if the feedback from the subscriber changed a call's disposition to unwanted. To perform the subscriber identity correlation (910), the feedback from the present subscriber is evaluated in combination with all previous subscriber feedback for the signature 650, where that previous feedback was also to change the disposition to unwanted, and excludes feedback from subscribers whose feedback has been ignored due to abuse, as described above. Using the calls associated with the subscriber feedback, a list of subscriber identities is sorted into respective subscriber identity formats, such as: E.164 numbers; URIs; instant messenger user names; or, any other format. Each respective list is processed separately because the procedure for processing each list depends on the subscriber identity format. If the number of subscriber identities in any of the respective lists is less than a minimum specified by the service provider, the list is ignored.

In order to test subscriber identities identified by numbers, including those subscriber identities whose URI's contain an E.164 or other number on the left-hand side of the domain, for example 3034443678@x.com, the list is sorted by the number portion of the subscriber identity, and the subscriber identity is examined for sequences where the most-significant digits, which start from the left, are identical to a specified number of digits. For example, it may be determined that there are 8 subscribers in the list with numbers of the form 30344*****, where * signifies a digit that is not matched. If the number of such matching numbers is greater than or equal to a predetermined threshold, the signature 650 is assumed to be associated with a sequential dialer and therefore unwanted. This is recorded in the signature 650 as a function test attribute 652 with a result that increases toward 1 as the number of such subscriber identities increases above the threshold in accordance with a formula or other algorithm designed for this function test.

For subscribers identified by URI or user name, a list of subscriber names is constructed from the left-hand side of URI's. The list is sorted in alphabetic order, and two tests are performed on the list. First, the list is examined for sequences where the most-significant characters are identical to a specified number of characters. For example, there may be 15 subscribers in the list with subscriber identities of the form "john*", where * is one or more characters of any value. Further, subscriber identities are added to the list that exactly match an entry in a list of common words or other character strings, such as for example "info". In combination these tests are useful for discovering what is commonly known as a "dictionary attack". If a number of matching subscriber identities is greater than or equal to a specified threshold, the caller is determined to be unwanted. This is recorded in the signature 650 as a function test attribute 652 with a result that increases toward 1 as the number of such subscriber identities increases above a predetermined threshold in accordance with a formula or other algorithm designed for this function test.

If the call is unwanted, either before or after the call disposition has been changed by the subscriber, the subscriber can also assign a category to the call. The category is selected from a list provided by the service provider. Examples of call categories were described above with reference to the Signatures database 126.

If a call category was entered (914) by the subscriber the subscriber feedback records associated with the signature 650 are retrieved. If the disposition was changed, only those records where the subscriber changed the disposition of the call to unwanted and selected a category are selected. Any feedback from those subscribers marked for abuse is excluded. The subscriber-designated categories are tallied and the category with the greatest number of subscriber votes is selected. If either the number of votes for the category or a percentage of the total number of selected votes is above a predetermined threshold, the signature is assigned to that category and the signature 650 is updated (916).

In one embodiment the above procedures are performed whenever a subscriber provides feedback. Alternatively, if it is desirable to govern use of resources, feedback from subscribers can be placed in a buffer and the analysis performed at a later time, or at predetermined intervals, as specified by the service provider.

After the subscriber feedback has been processed, the call history records in the Called History database 124 are updated (920) with any subscriber feedback that initiated the above described procedures, such as the subscriber's feedback on call disposition and category.

The invention thereby provides an intelligent, adaptive call screening system that rapidly responds to new threats while constantly revising screening parameters to optimize subscriber service and ensure that wanted calls are completed to the subscriber while unwanted calls are blocked to the greatest possible extent.

Although the invention has been described with reference to specific samples, ranges and parameters, it should be understood that those were exemplary only. The scope of the invention is therefore intended to be limited solely by the scope of the appended claims.

I claim:

1. A method of managing an incoming call to a service subscriber, comprising:
    performing at least one real-time function test on a call offer message associated with the incoming call to build a signature for the incoming call; and
    using information associated with the signature to compute a suspect score and a confidence level respecting the incoming call to make an incoming call management decision to determine a treatment for the incoming call.

2. The method as claimed in claim 1 wherein performing at least one real-time function test comprises performing at least one function test to confirm a validity of a caller identity and a call source associated with the call offer message.

3. The method as claimed in claim 1 further comprising storing the signature in a call state database prior to using the information to make the incoming call management decision.

4. The method as claimed in claim 1 further comprising using the suspect score and the confidence level to determine whether the caller identity is valid.

5. The method as claimed in claim 4 wherein if the caller identity is valid, the method further comprises checking a subscriber black list to determine whether the caller identity is associated with an unwanted caller, and directing the incoming call to special treatment if the caller identity is in the subscriber black list.

6. The method as claimed in claim 5 wherein if the caller identity is valid and not in the subscriber black list, the method further comprises checking a subscriber white list to determine whether the caller identity is associated with an wanted caller, and offering the incoming call to the subscriber if the caller identity is in the subscriber white list.

7. The method as claimed in claim 6 wherein checking the subscriber white list comprises checking a permanent white list maintained by the subscriber, and checking a dynamic white list automatically maintained by a call director responsible for making the incoming call management decision.

8. The method as claimed in claim 1 wherein if the caller identity is not valid, the method comprises using the signature to search a signatures database for matching signatures to determine the treatment for the incoming call.

9. The method as claimed in claim 7 wherein if the caller identity is valid but of the caller identity is not found in the subscriber black list, the subscriber white list, or the dynamic white list the method further comprises performing function test to determine whether the call is suspect to determine the treatment for the call.

10. The method as claimed in claim 9 wherein if it is determined that the call is suspect, the suspect score is analyzed to determine whether the call requires special treatment.

11. The method as claimed in claim 10 wherein if special treatment is required for the call, the special treatment is selected from a plurality of options using information retrieved from a subscriber preferences database.

12. The method as claimed in claim 10 wherein if it is determined that special treatment is not required, the incoming call is offered to the subscriber.

13. A call director for making incoming call management decisions respecting incoming calls for subscribers to an incoming call management service, the call director comprising:
    at least one interface that receives call control messages associated with the incoming calls;
    at least one interface that queries a signatures database;
    program instructions that perform function tests associated with various call states of the incoming calls;
    program instructions that build a signature associated with each of the incoming calls using results of the function tests; and
    program instructions for using information associated with the signature to compute a suspect score and a confidence level respecting the incoming call to make incoming call management decisions.

14. A system for providing an incoming call management service, comprising:
    a call director that receives call control messages respecting incoming calls to subscribers of the incoming call management service, performs function tests associated with various call states of the incoming calls, builds a call signature associated with each incoming call using the function test results, uses information associated with the signature to compute a suspect score and a confidence level respecting the incoming call to make incoming call management decisions;
    a subscriber's preferences database that stores subscriber preference information also used by the call director in making the call management decisions; and
    a signatures database that stores selected signatures built by the call director.

15. The system as claimed in claim 14 further comprising a call state database for storing the call signatures and other information about incoming calls required by the call director, while the incoming calls are being tracked by the call director.

16. The system as claimed in claim 14 further comprising a scratchpad database for storing original copies of call control messages received in a format that is not native to a service provider's network that supports the call director.

17. The system as claimed in claim 14 further comprising a call history database for storing call records associated with calls tracked by the call director.

18. The system as claimed in claim 14 further comprising a record analyzer for analyzing call detail records associated with calls not monitored by the call director to improve call screening procedures by analyzing a greater volume of call data.

19. The system as claimed in claim 14 further comprising a global signatures database for storing call signatures that are shared with other service providers of incoming call management services.

* * * * *